US012468241B2

(12) United States Patent
Sato et al.

(10) Patent No.: US 12,468,241 B2
(45) Date of Patent: Nov. 11, 2025

(54) TONER CONTAINER AND IMAGE FORMING SYSTEM

(71) Applicant: CANON KABUSHIKI KAISHA, Tokyo (JP)

(72) Inventors: Mitsuhiro Sato, Tokyo (JP); Hiroyuki Munetsugu, Kanagawa (JP); Masaaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/491,231

(22) Filed: Oct. 20, 2023

(65) Prior Publication Data

US 2024/0142893 A1 May 2, 2024

(30) Foreign Application Priority Data

Oct. 31, 2022 (JP) ................................ 2022-174112

(51) Int. Cl.
*G03G 15/08* (2006.01)

(52) U.S. Cl.
CPC . *G03G 15/0874* (2013.01); *G03G 2215/0682* (2013.01); *G03G 2215/0695* (2013.01)

(58) Field of Classification Search
CPC ........... G03G 15/0863; G03G 15/0874; G03G 15/0886
USPC .......................................................... 399/262
See application file for complete search history.

(56) References Cited

U.S. PATENT DOCUMENTS

2006/0065710 A1* 3/2006 Endo .................... B41J 2/17546 235/462.15
2009/0263164 A1* 10/2009 Koeda ................ G03G 15/0855 399/262

FOREIGN PATENT DOCUMENTS

JP 2006098975 A 4/2006
JP 2007114667 A 5/2007
JP 2021026202 A 2/2021
JP 2022076822 A 5/2022

* cited by examiner

*Primary Examiner* — Hoang X Ngo
(74) *Attorney, Agent, or Firm* — Canon U.S.A., Inc. IP Division

(57) ABSTRACT

A toner container includes a bag body, a coupling member, and a discharge member. The bag body includes a side portion and has, formed in the bag body, storage space configured to store toner and having flexibility. The coupling member is coupled with an opening of the bag body. The discharge member discharges the toner stored in the storage space. The side portion extends in a first direction from the opening to a bottom portion opposite the opening. Two-dimensional code is provided on an outer surface opposite an inner surface of the side portion that forms the storage space for toner. The two-dimensional code is located closer to the bottom portion than to the opening in the first direction.

13 Claims, 25 Drawing Sheets

TONER CONTAINER AND IMAGE FORMING SYSTEM

BACKGROUND

Field

The present disclosure relates to a toner container and an image forming system.

Description of the Related Art

In an electrophotographic image forming apparatus, an electrostatic latent image formed on an image bearing member, such as a photosensitive drum, is developed using toner serving as a developer and, thus, the image is visualized in the form of a toner image. To supply toner to make up for toner consumed by development, a filler opening is provided in the image forming apparatus, and when toner refill is needed, a toner container is attached to the filler opening, and only the toner in the toner container is transferred into the image forming apparatus. Japanese Patent Laid-Open No. 2021-026202 describes a toner container including a bag body (a pouch) made of a flexible film and a base having a feed opening to be connected to the filler opening of the image forming apparatus and used to discharge the toner in the pouch.

SUMMARY

According to an aspect of the present disclosure, a toner container includes a bag body including a side portion and having, formed in the bag body, storage space configured to store toner and having flexibility, a coupling member coupled with an opening of the bag body, and a discharge member configured to discharge the toner stored in the storage space, wherein the side portion extends in a first direction from the opening to a bottom portion opposite the opening, wherein two-dimensional code is provided on an outer surface opposite an inner surface of the side portion that forms the storage space for toner, and wherein the two-dimensional code is located closer to the bottom portion than to the opening in the first direction.

Further features of the present disclosure will become apparent from the following description of exemplary embodiments with reference to the attached drawings.

DESCRIPTION OF THE EMBODIMENTS

First Embodiment

Exemplary embodiments of the present disclosure are described below with reference to the accompanying drawings.

Overall Configuration

Figure 1A:
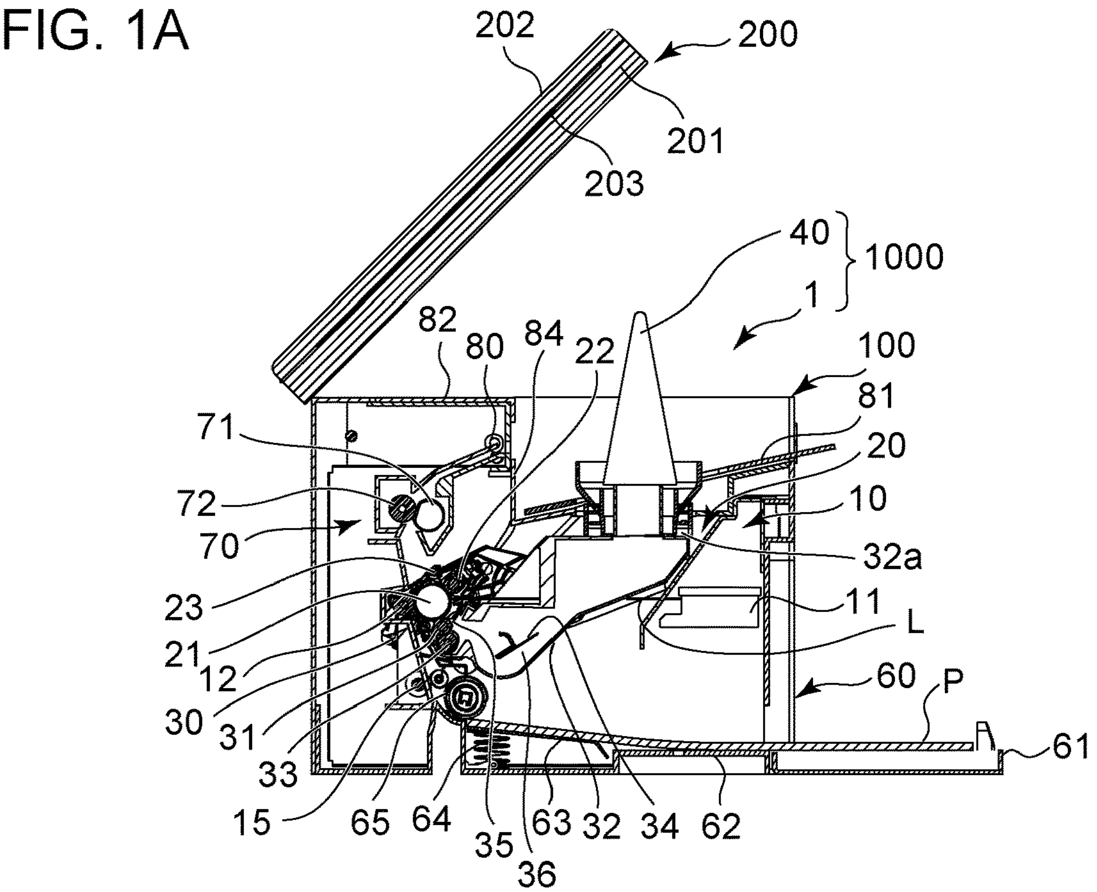
FIG. 1A is a cross-sectional view of an image forming apparatus according to a first embodiment.
Figure 1B:
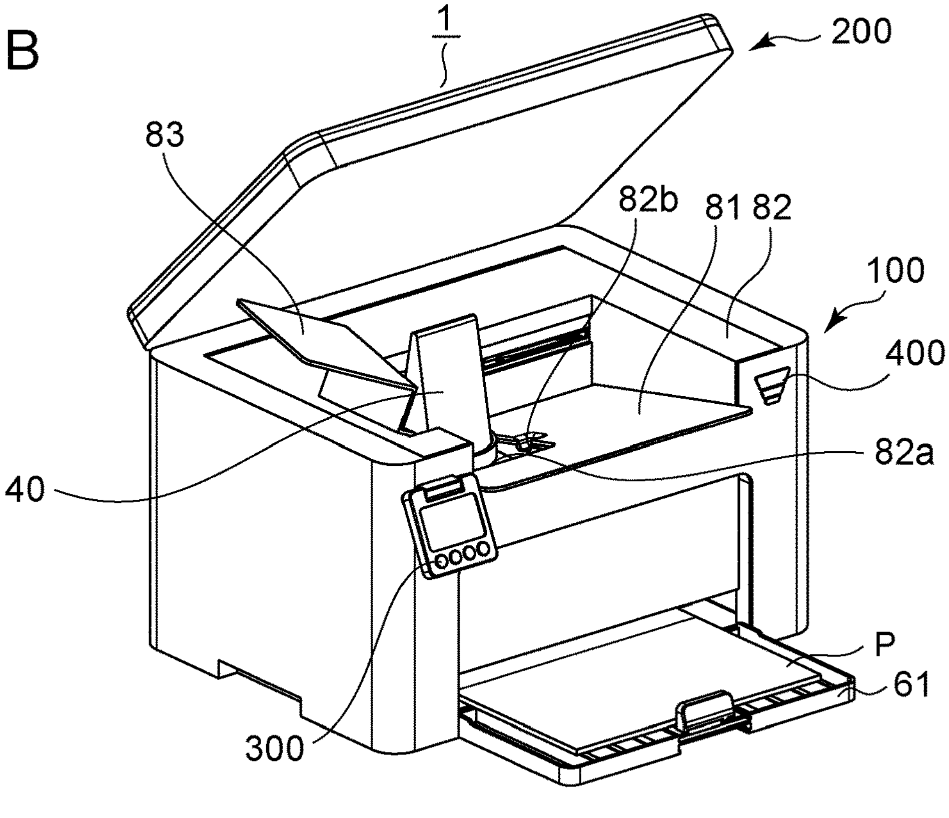
FIG. 1B is a perspective view of the image forming apparatus.
Figure 2:
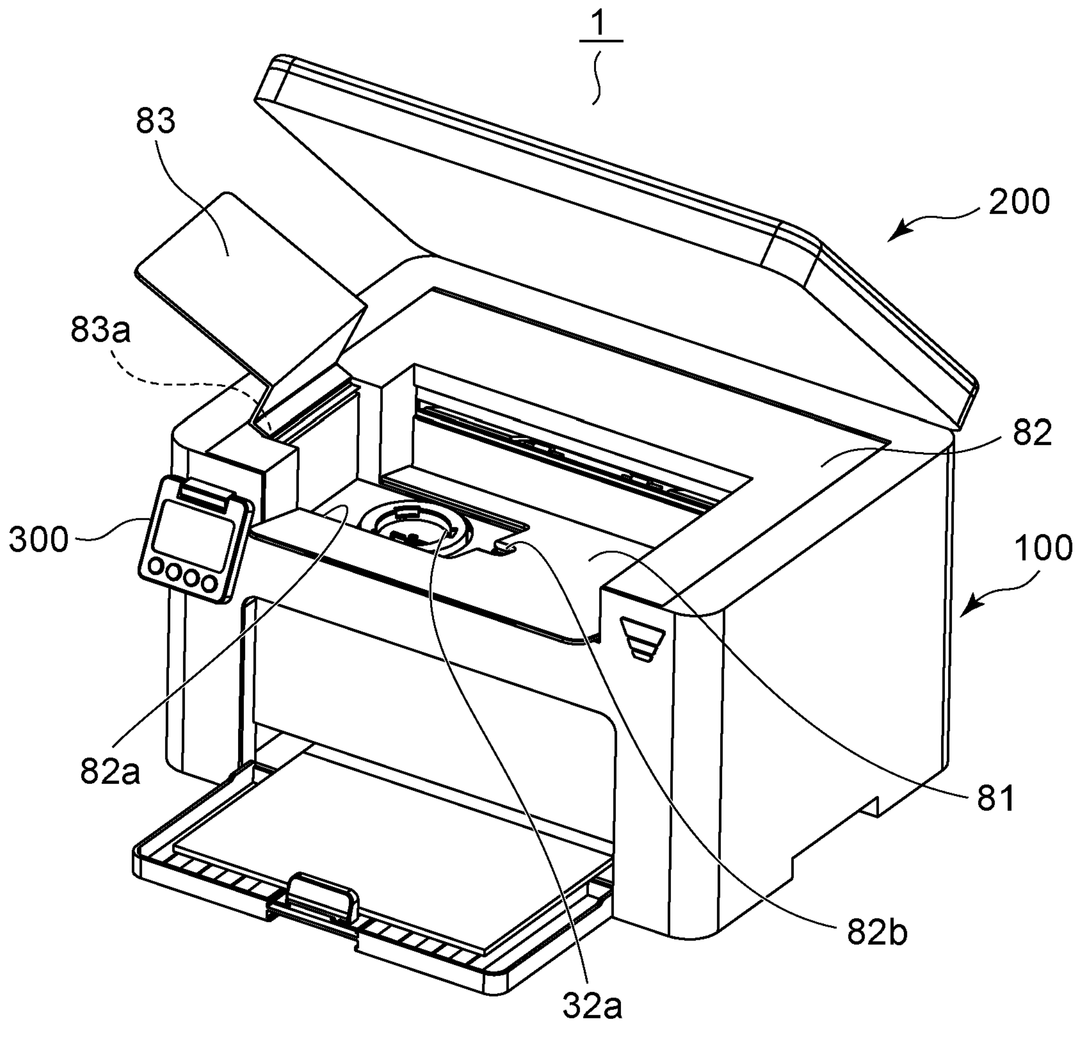
FIG. 2 is a perspective view of the image forming apparatus according to the first embodiment.

FIG. 1A is a cross-sectional view of the configuration of an image forming apparatus 1 according to an embodiment of the present disclosure, and FIGS. 1B and 2 are perspective views of the image forming apparatus 1. The image forming apparatus 1 is a monochrome printer that forms an image on a recording medium on the basis of image information input from an external device. Examples of a recording medium include a variety of sheet members of different materials, such as paper (plain paper, heavy paper, and the like), plastic film (an overhead projector sheet and the like), specially shaped sheets (an envelope, index paper, and the like), and cloth.

As illustrated in FIGS. 1A and 1B, the image forming apparatus 1 includes a printer body 100 serving as the main body of the apparatus, a scanning device 200 that is openably supported by the printer body 100, and an operation unit 300 mounted on an exterior surface of the printer body 100. The printer body 100 includes an image forming unit 10 that forms a toner image on a recording medium, a feed unit 60 that feeds a recording medium to the image forming unit 10, a fixing unit 70 that fixes the toner image formed by the image forming unit 10 on the recording medium, and a discharge roller pair 80.

The image forming unit 10 includes a scanner unit 11, an electrophotographic process unit 20, and a transfer roller 12 that transfers a toner image formed on the photosensitive drum 21 of the process unit 20 to a recording medium. The process unit 20 includes the photosensitive drum 21 and a developing device 30 having, disposed around the photosensitive drum 21, a charging roller 22, a pre-exposure device 23, and a development roller 31.

The photosensitive drum 21 is an image bearing member that bears an electrostatic latent image and a toner image (a developer image). The photosensitive drum 21 is a cylindrically formed photosensitive member. The photosensitive drum 21 according to the present embodiment includes a photosensitive layer formed by a negatively charged organic photoreceptor on a drum-shaped base made of aluminum. The photosensitive drum 21 is driven by a motor to rotate in a predetermined direction (the clockwise direction in FIG. 1A) at a predetermined process speed.

The charging roller 22 is in contact with the photosensitive drum 21 with a predetermined pressure contact force and forms a charging portion. The charging roller 22 uniformly charges the surface of the photosensitive drum 21 at a predetermined potential when a desired charging voltage is applied by a charging high voltage power source. According to the present embodiment, the photosensitive drum 21 is charged to negative polarity by the charging roller 22. The pre-exposure device 23 eliminates the surface potential of the photosensitive drum 21 before the photosensitive drum 21 enters the charging portion in order to cause stable electrical discharge in the charging portion.

The scanner unit 11 serving as an exposure unit scans and exposes the surface of the photosensitive drum 21 by emitting a laser beam corresponding to image information input from an external device or the scanning device 200 onto the photosensitive drum 21 by using a polygon mirror. The exposure operation forms an electrostatic latent image on the surface of the photosensitive drum 21 in accordance with the image information. The scanner unit 11 is not limited to a laser scanner device. For example, an LED exposure device may be employed that includes an LED array having a plurality of LEDs arranged along the longitudinal direction of the photosensitive drum 21.

The developing device 30 includes the development roller 31 serving as a developer bearing member that bears a developer, a development container 32 that serves as the frame of the developing device 30, and a supply roller 33 that can supply a developer to the development roller 31. The development roller 31 and supply roller 33 are rotatably supported by the development container 32. The development roller 31 is disposed at an opening of the development container 32 so as to face the photosensitive drum 21. A supply roller 33 is in rotatable contact with the development roller 31, and toner serving as a developer contained in the development container 32 is applied to the surface of the development roller 31 by the supply roller 33. The supply roller 33 is not necessarily needed if a configuration capable of supplying sufficient toner to the development roller 31 is employed.

The developing device 30 according to the present embodiment uses a contact development method as the development method. That is, the toner layer on the development roller 31 is brought into contact with the photosensitive drum 21 in a developing portion (a developing region) where the photosensitive drum 21 and the development roller 31 face each other. A developing voltage is applied to the development roller 31 by a developing high voltage power source. Under the developing voltage, the toner on the development roller 31 is transferred from the development roller 31 to the drum surface according to the potential distribution on the surface of the photosensitive drum 21 and, thus, the electrostatic latent image is developed into a toner image. According to the present embodiment, the reversal developing method is employed. That is, after the surface of the photosensitive drum 21 is charged in a charging process, a certain surface region is exposed in an exposure process so that the amount of charge is decreased, and toner is deposited to the surface region. Thus, a toner image is formed.

According to the present embodiment, powder toner having a negative normal charge polarity is used. More precisely, according to the present embodiment, the particle size of the powder toner is greater than or equal to 2 μm and less than or equal to 15 μm. The angle of repose of the toner is greater than or equal to 50° and less than or equal to 80°. An example of the particle size of the above-described toner is 6 μm, and an example of the angle of repose of the toner is 62°. According to the present embodiment, the toner is, for example, a polymerized toner produced by a polymerization method. In addition, according to the present embodiment, the toner does not contain a magnetic component and is known as non-magnetic one-component developer in which the toner is borne on the development roller 31 mainly by intermolecular forces and electrostatic forces (mirror image forces). However, one-component developer containing a magnetic component may be used. The one-component developer may contain additives (e.g., wax or silica particles) in addition to toner particles to adjust the fluidity and charging performance of the toner. A two-component developer containing a non-magnetic toner and a magnetic carrier may be used as a developer. When a developer having magnetic properties is used, a cylindrical developing sleeve having a magnet thereinside is used as the developer bearing member, for example.

The development container 32 includes a storage portion 36 serving as a second toner storage portion for storing toner and an agitating member 34 serving as an agitating unit disposed inside the storage portion 36. The agitating member 34 is driven to rotate by a motor (not illustrated). Thus, the agitating member 34 agitates the toner in the development container 32, feeds the toner toward the development roller 31 and the supply roller 33. In addition, the agitating member 34 circulates, in the development container 32, the toner that is not used for development and that is stripped off from the development roller 31, so that the toner is uniformized in the development container 32. The agitating member 34 is not limited to a rotating agitating member. For example, a swinging agitating member may be employed.

At the opening of the development container 32 where the development roller 31 is disposed, a developing blade 35 is disposed to regulate the amount of toner borne on the development roller 31. The toner supplied to the surface of the development roller 31 is made into a thin layer uniformly and is charged with negative polarity by triboelectric charging as the toner passes through a region facing the developing blade 35 in accordance with the rotation of the development roller 31.

As illustrated in FIGS. 1A and 1B, the feed unit 60 includes a front door 61 that is openably supported by the printer body 100, a tray unit 62, an intermediate plate 63, a tray spring 64, and a pickup roller 65. The tray unit 62 constitutes the bottom surface of a recording medium storage space that appears when the front door 61 is open, and the intermediate plate 63 is elevatably supported by the tray unit 62. The tray spring 64 urges the intermediate plate 63 upward and presses a recording medium P stacked on the intermediate plate 63 against the pickup roller 65. When the front door 61 is closed with respect to the printer body 100, the recording medium storage space is closed. When the front door 61 is open with respect to the printer body 100, the front door 61 supports the recording medium P together with the tray unit 62 and the intermediate plate 63.

The fixing unit 70 is of a heat fixing type that heats and melts the toner on the recording medium to fix an image to the recording medium. The fixing unit 70 includes a fixing film 71, a fixing heater, such as a ceramic heater that heats the fixing film 71, a thermistor that measures the temperature of the fixing heater, and a pressure roller 72 that is in pressure contact with the fixing film 71.

The image forming operation performed by the image forming apparatus 1 is described below. When an image forming command (a print job) is input to the image forming apparatus 1, an image forming process to be performed by the image forming unit 10 is started on the basis of image information input from an external computer or the scanning device 200 connected to the image forming apparatus 1. The scanner unit 11 emits a laser beam to the photosensitive drum 21 on the basis of the input image information. At this time, the photosensitive drum 21 is charged by the charging roller 22 in advance, and an electrostatic latent image is formed on the photosensitive drum 21 by the emitted laser beam. Thereafter, the electrostatic latent image is developed by the development roller 31, and a toner image is formed on the photosensitive drum 21.

In parallel with the image forming process described above, the pickup roller 65 of the feed unit 60 feeds the recording medium P supported by the front door 61, the tray unit 62, and the intermediate plate 63. The recording medium P is fed by the pickup roller 65 to a registration roller pair 15, and skew is corrected when the recording medium P hits the nip of the registration roller pair 15. The registration roller pair 15 is then driven in synchronization with the toner image transfer operation and conveys the recording medium P toward a transfer nip formed by the transfer roller 12 and photosensitive drum 21.

A transfer voltage is applied from a transfer high voltage power source to the transfer roller 12 serving as a transfer unit, and the toner image borne on the photosensitive drum 21 is transferred to the recording medium P conveyed by the registration roller pair 15. The recording medium P having the toner image transferred thereonto is conveyed to the fixing unit 70. When passing through a nip formed by the fixing film 71 and the pressure roller 72 of the fixing unit 70, the toner image is heated and pressurized. This causes the toner particles to melt and then solidify, which fixes the toner image on the recording medium P. The recording medium P that has passed through the fixing unit 70 is discharged to the outside of the image forming apparatus 1 (the outside of the apparatus) by a discharge roller pair 80 serving as a discharge unit and is stacked onto a discharge tray 81 serving as a stacking unit provided at the top of the printer body 100.

The discharge tray 81 is sloped upward toward the downstream in the recording medium discharge direction, and the trailing edges of the recording media discharged onto the discharge tray 81 are aligned by a regulating surface 84 when the recording media slide down the discharge tray 81. In FIGS. 1A and 1B and FIG. 2, an opening and closing member 83 (described below) is open. However, when the image forming operation is performed, the opening and closing member 83 is closed in advance.

The scanning device 200 includes a scanning unit 201 having a scanning portion (not illustrated) thereinside and a pressure plate 202 that is openably supported by the scanning unit 201. Original base plate glass 203 on which an original is to be placed is provided on the upper surface of the scanning unit 201. The original base plate glass 203 allows light emitted from the scanning portion to pass therethrough.

When a user wants the image of an original to be scanned by the scanning device 200, the user opens the pressure plate 202 and places the original on the original base plate glass 203. Thereafter, the user closes the pressure plate 202. Thus, misalignment of the original on the original base plate glass 203 is prevented. Thereafter, for example, the user operates the operation unit 300 to output a scan command to the image forming apparatus 1. When the scanning operation is started, the scanning portion of the scanning unit 201 moves back and forth in the sub-scanning direction, that is, the scanning portion moves back and forth in the right-left directions when the operation unit 300 of the image forming apparatus 1 is seen in front. The scanning portion emits light from a light emitting unit to the original, receives light reflected by the original using a light receiving unit, and photoelectrically converts the light. Thus, the scanning portion reads the image of the original. In the following description, the front-rear direction, the right-left direction, and the up-down direction are defined with reference to a situation in which the operation unit 300 is seen in front.

A top cover 82 serving as a loading tray is provided at the top of the printer body 100, and the discharge tray 81 serving as a loading surface is formed on the upper surface of the top cover 82. As illustrated in FIGS. 1B and 2, the opening and closing member 83 is supported by the top cover 82 in an openable manner about a rotation shaft 83*a* extending in the front-rear direction. The discharge tray 81 of the top cover 82 has, formed therein, an opening 82*a* that opens upward.

The opening and closing member 83 is movable between a closed position and an open position. In the closed position, a filler opening 32*a* is covered so that a toner pack 40 cannot be attached to the development container 32. In the open position, the filler opening 32*a* is exposed so that the toner pack 40 can be attached to the development container 32. In the closed position, the opening and closing member 83 functions as a part of the discharge tray 81. The opening and closing member 83 and the opening 82*a* are formed on the left side of the discharge tray 81. The opening and closing member 83 is opened to the left by hanging a finger from a groove 82*b* formed in the top cover 82. The opening and closing member 83 is formed in a substantially L-shape along the shape of the top cover 82.

The opening 82*a* of the discharge tray 81 is open so that the filler opening 32*a* formed at the top of the development container 32 for toner refill is exposed. When the opening and closing member 83 is open, the user can access the filler opening 32*a*. According to the present embodiment, a direct refilling method is adopted in which the user supplies toner to the developing device 30 from the toner pack 40 (refer to FIGS. 1A and 1B) with the developing device 30 mounted in the image forming apparatus 1. When mounted on the image forming apparatus 1, the toner pack 40 is at least partially exposed to the outside of the image forming apparatus 1.

This configuration improves the usability because there is no need to remove the process unit 20 from the printer body 100 and mount a new process unit when the toner level in the process unit 20 is low. In addition, the development container 32 can be refilled with toner at a lower cost than in the case of replacing the process unit 20 with new one. The direct refilling method also reduces costs as compared with a method for replacing only the developing device 30 of the process unit 20, because there is no need to replace a variety of rollers, gears, and the like.

An image forming system 1000 includes an image forming apparatus 1 having the filler opening that can be exposed to the outside and the toner pack 40 that is mounted on and removed from the image forming apparatus 1 to supply toner to the image forming apparatus 1 via the filler opening. The toner pack 40 illustrated in FIGS. 1A and 1B is a reference example and differs in shape from a toner pack 600 (described below).

Configuration of Toner Pack

A toner (developer) refilling system for the image forming apparatus 1 according to the present embodiment is described below. The basic configuration of the toner pack 600 that stores toner and that can be attached to and removed from the image forming apparatus 1 (the apparatus body) is first described with reference to FIGS. 3A to 6B.

Figure 3A:
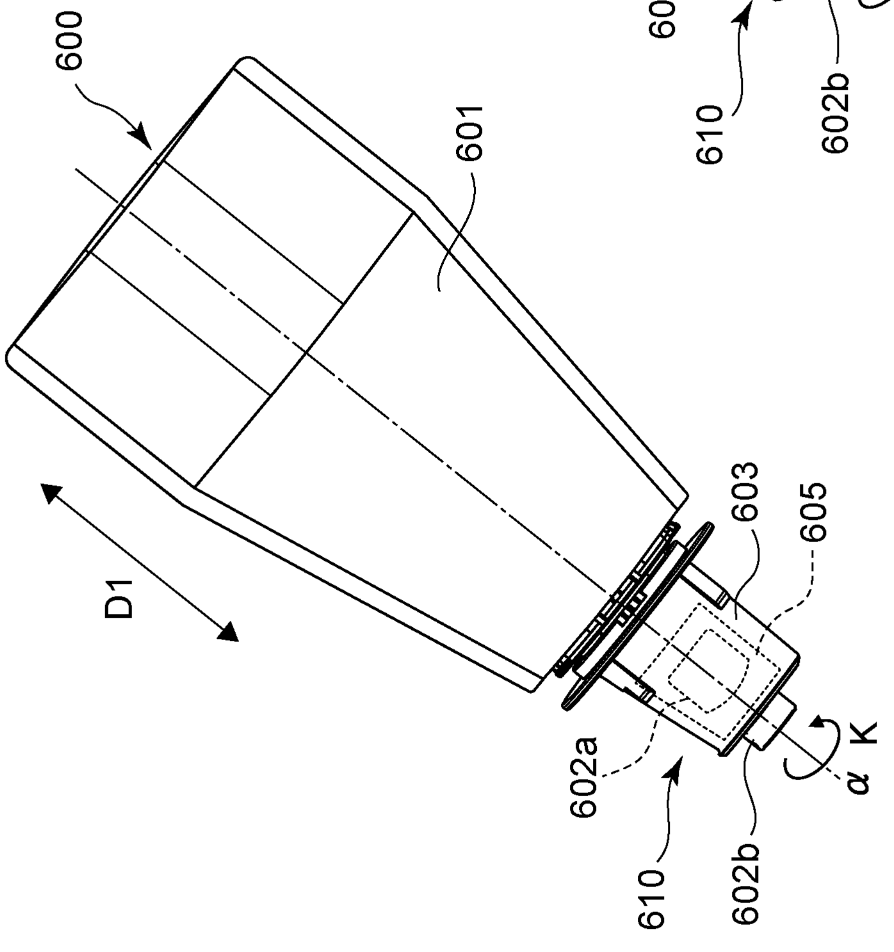
FIGS. 3A and 3B are side views of a toner pack according to the first embodiment.
Figure 3B:
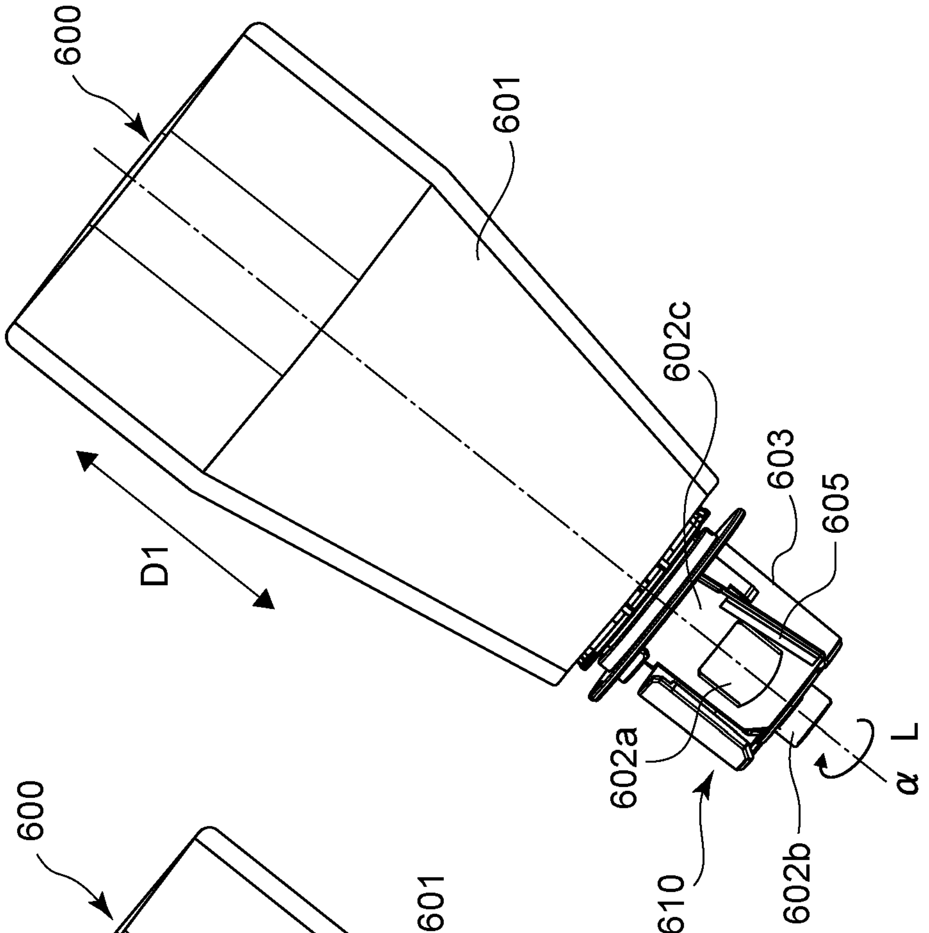
Figure 4:
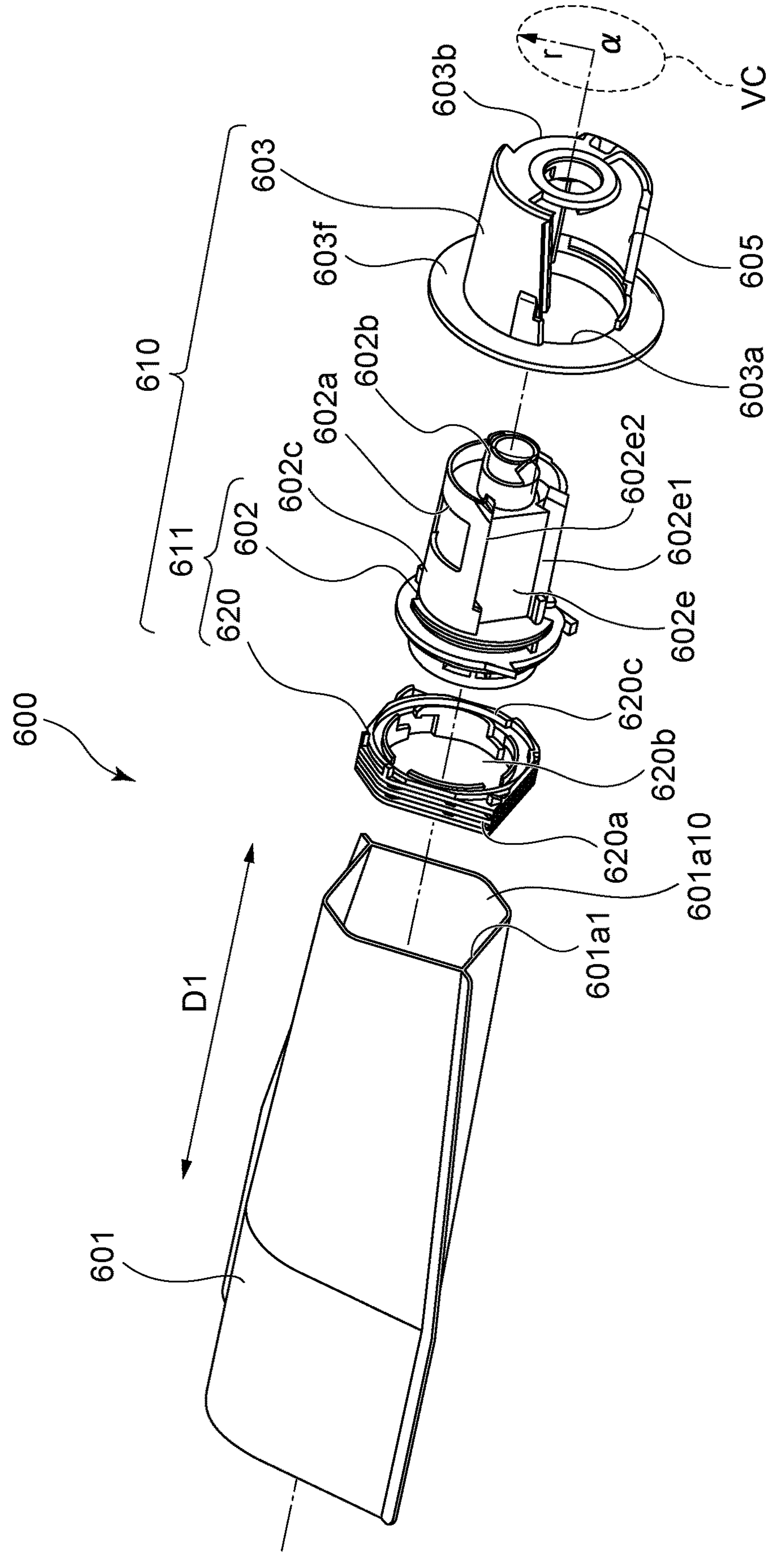
FIG. 4 is an exploded perspective view of the toner pack according to the first embodiment.
Figure 5A:
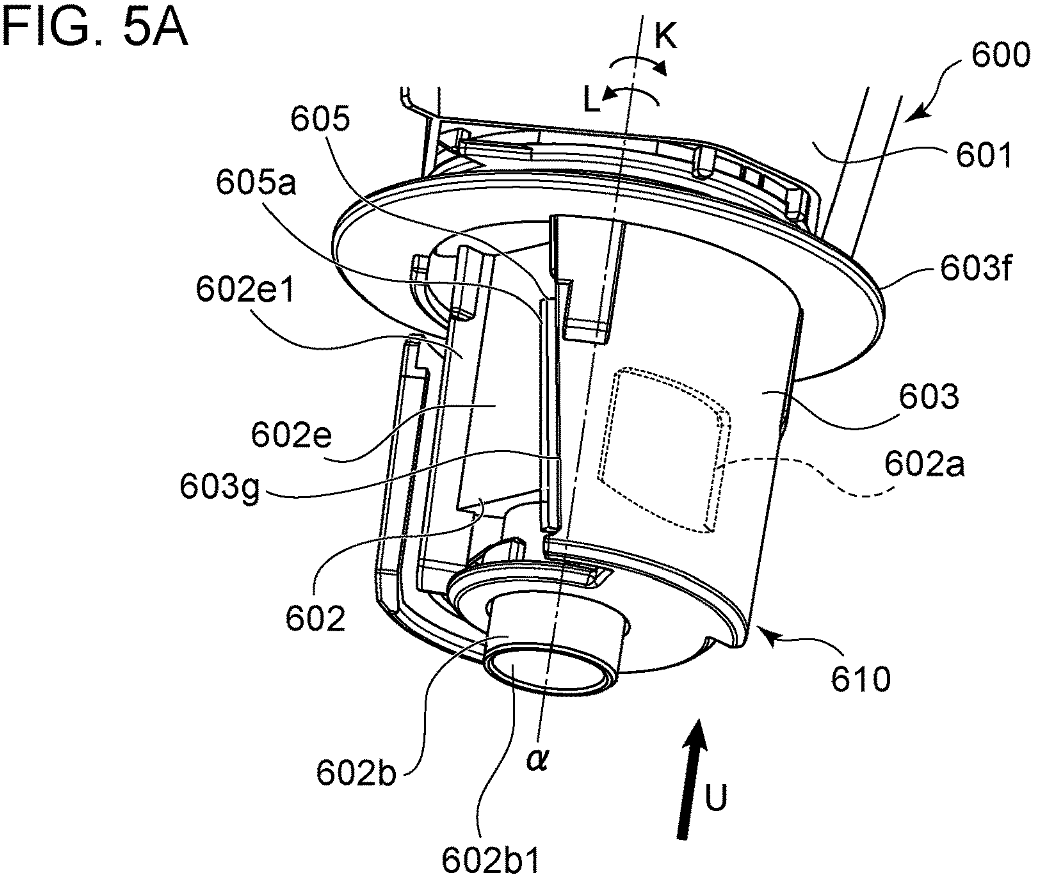
FIG. 5A is a perspective view of a nozzle of the toner pack according to the first embodiment.
Figure 5B:
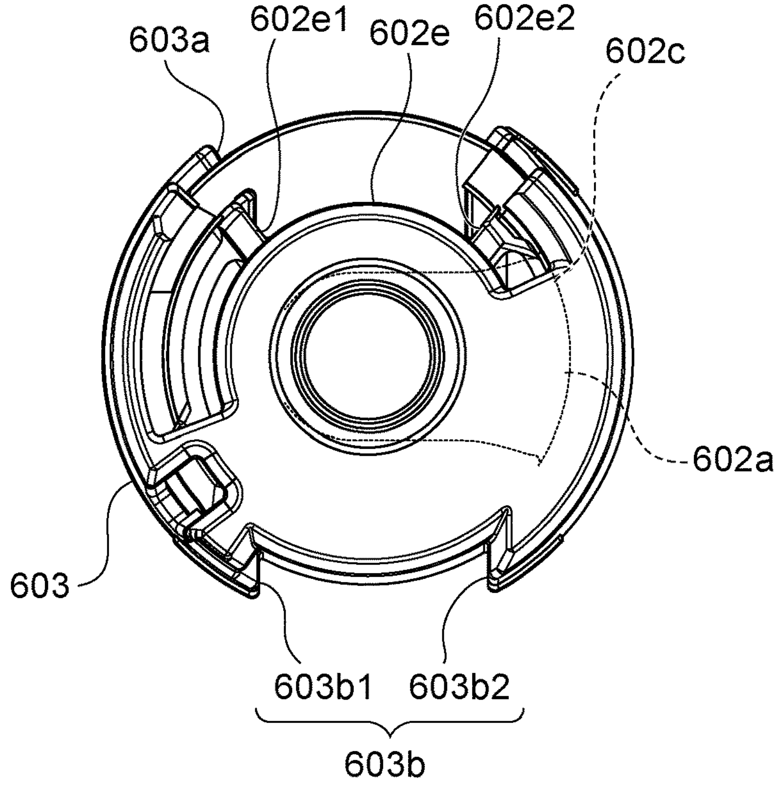
FIG. 5B is a bottom view of the nozzle.
Figure 6A:
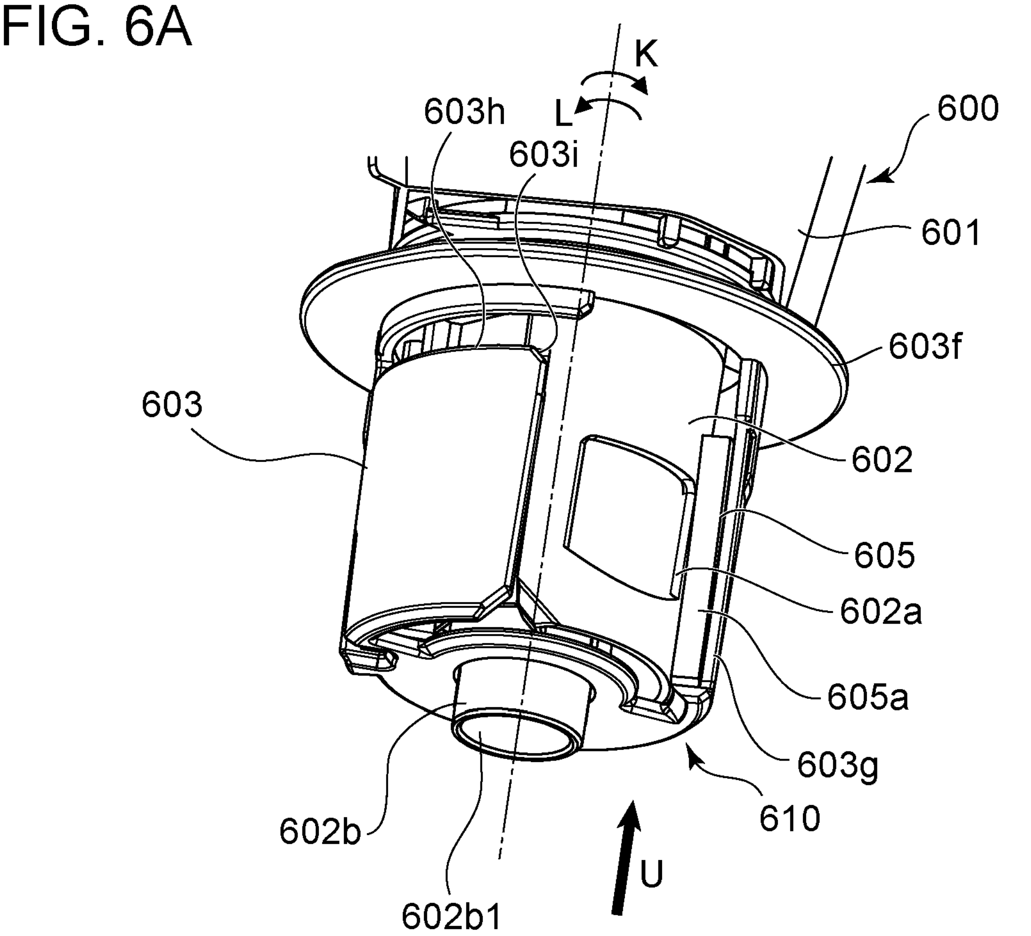
FIG. 6A is a perspective view of the nozzle of the toner pack according to the first embodiment.
Figure 6B:
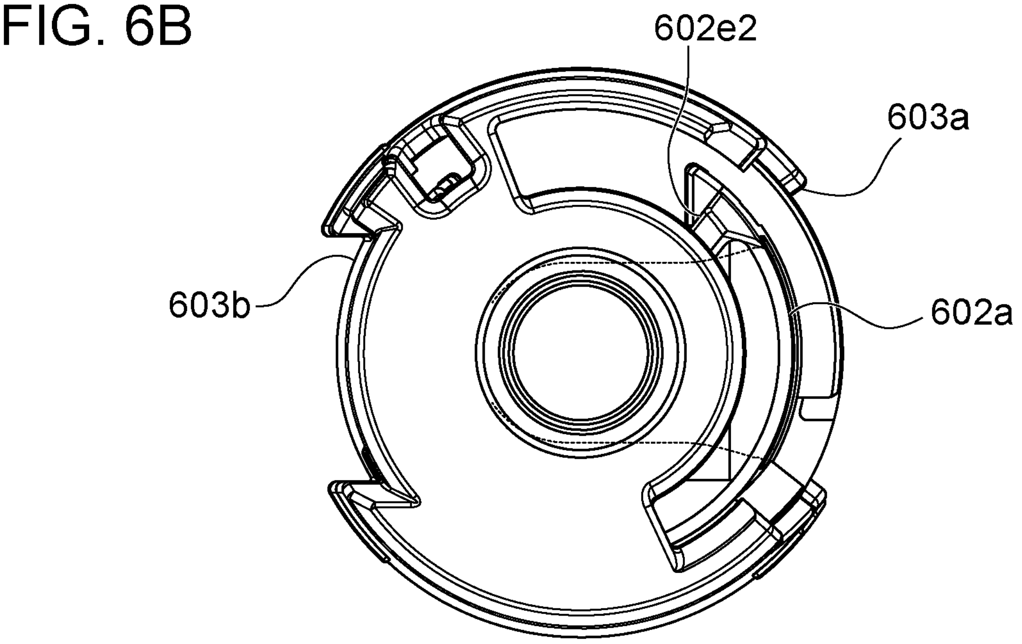
FIG. 6B is a bottom view of the nozzle.

More precisely, the toner pack 600 serving as a toner container is mounted on a mounting unit 500 (described below) provided in the image forming apparatus 1. FIG. 3A is a front view of the toner pack 600 when a pack-side shutter 603 is in a covering position. FIG. 3B is a front view of the toner pack 600 when the pack-side shutter 603 is in an uncovering position. FIG. 4 is an exploded perspective view of the toner pack 600. FIG. 5A is an enlarged view of a nozzle 602 and its vicinity when the pack-side shutter 603 is in the covering position. FIG. 5B is a view of the toner pack 600 as viewed in the direction of arrow U in FIG. 5A. FIG. 6A is an enlarged view of the nozzle 602 and its vicinity when the pack-side shutter 603 is in the uncovering position. FIG. 6B is a view of the toner pack 600 as viewed in the direction of arrow U in FIG. 6A.

The toner pack 600 includes a pouch 601 serving as a first toner storage portion that stores toner, an outer ring member 620 (a coupling member) coupled with the pouch 601, the nozzle 602 (a connecting member), and the pack-side shutter 603. The outer ring member 620 and the nozzle 602 constitute a base portion 611 connected to the pouch 601.

As illustrated in FIGS. 3A and 3B, the pouch 601 is provided at one end side of toner pack 600 in an axial direction D1 that is a first direction. A nozzle unit 610 including an outer ring member 620, a nozzle 602, and a pack-side shutter 603 is provided on the other end side of the toner pack 600 in the axial direction D1. The nozzle unit 610 functions as a discharge member to discharge toner in the pouch 601. In addition, the nozzle unit 610 is a communication member (an adaptor portion, a connecting portion) that enable the inner space of the pouch 601 (toner storage space) to communicate with the filler opening 32*a* of the printer body 100 when the toner pack 600 is mounted on the mounting unit 500 of the printer body 100.

The pouch 601 is a bag body made of a flexible film member (sheet member), such as a polypropylene film, and has a bag shape with one end open.

As illustrated in FIG. 4, the outer ring member 620 has a coupling surface 620*a* that is coupled with (fixed to) one end of the pouch 601 adjacent to an opening 601*a*10 (the opening of the pouch 601) and a connecting portion 620*c* that is connected to the nozzle 602. An opening edge 601*a*1 of the pouch 601 is coupled with the coupling surface 620*a* (a coupling portion) of the outer ring member 620. Examples of a coupling method include a method using various adhesive agents, such as hot melt, and a method in which the pouch 601 is heat-welded to the outer periphery of the outer ring member 620. However, the method is not limited to a particular coupling method, and any method can be employed that can seal the pouch 601 so that no toner leakage occurs.

The nozzle 602 serving as a base member is connected to the connecting portion 620*c* of the outer ring member 620 serving as a cylinder member. The connecting portion 620*c* has a hole 620*b*. Toner can pass through the hole 620*b*. This configuration allows the pouch 601 to be easily filled with toner through the hole 620*b* and the coupling surface 620*a* of the outer ring member 620. For example, the pouch 601 is filled with toner with the pouch 601 coupled with the lower part of the outer ring member 620 and, thereafter, the nozzle 602 is coupled to the outer ring member 620. By employing the configuration, a larger amount of toner can be filled in a shorter time without using complicated equipment. This is because the hole 620*b* of the outer ring member 620 has a larger area than a discharge port 602*a* of the nozzle 602, making toner filling easier and the toner flow path simpler.

A side surface 602*c* that is the outer surface of the nozzle 602 extending in the axial direction D1 includes the discharge port 602*a* configured to communicate with the interior of the pouch 601 and a recess 602*e*. The recess 602*e* is provided at a different location from the location of the discharge port 602*a* in the rotation direction of the pack-side shutter 603. The configuration is such that the toner stored in the pouch 601 is discharged to the outside of the toner pack 600 via the discharge port 602*a*. The base portion 611 may be a resin molded product in which the nozzle 602 and the outer ring member 620 are integrally molded.

A pack-side shutter 603 serving as a container shutter or a first shutter is disposed on the outer side of the side surface 602*c* of the nozzle 602. The pack-side shutter 603 is rotatable about a rotational axis α extending in the axial direction D1 and is disposed on the outer side of the side surface 602*c* in a radial direction r of an imaginary circle VC centered on the rotational axis α. The side surface 602*c* of the nozzle 602 is a convex curved surface that is convex outward in the radial direction r of the imaginary circle VC centered on the rotational axis α (a substantially cylindrical surface). The inner surface of the pack-side shutter 603, that is, the surface facing the side surface 602*c*, is a curved surface extending along the side surface 602*c* of the nozzle 602. A pack-side seal 605 serving as a substantially rectangular-shaped first sealing member is attached to the inner surface. As illustrated in FIGS. 5A and 5B, an end surface 603*g* that forms an opening 603*a* of the pack-side shutter

603 and an end surface 605*a* of the pack-side seal 605 are sloping surfaces inclined to the rotational axis α. The end surface 605*a* of the pack-side seal 605 is attached at a position so as to protrude toward the opening 603*a* more than the end surface 603*g* of the pack-side shutter 603.

The pack-side shutter 603 is configured to rotate about the rotational axis α between a covering position serving as a first covering position where the pack-side seal 605 covers the discharge port 602*a* of the nozzle 602 and an uncovering position serving as a first uncovering position where the discharge port 602*a* is open. When the pack-side shutter 603 is in the uncovering position, the discharge port 602*a* of the nozzle 602 is exposed through the opening 603*a*. As illustrated in FIG. 5A, when the pack-side shutter 603 is in the covering position, at least part of the recess 602*e* of the nozzle 602 is exposed from the pack-side shutter 603 through the opening 603*a*.

At the end in the axial direction D1 of the pack-side shutter 603 adjacent to the pouch 601, a disc-shaped flange 603*f* is provided that extends from the substantially cylindrical side surface of the pack-side shutter 603 outwardly in the radial direction r. That is, the nozzle unit 610 serving as the discharge member has the flange 603*f* that is located between the discharge port 602*a* and the pouch 601 in the axial direction D1 (the first direction) and that extends from the outer surface of the pack-side shutter 603 outwardly in the radial direction r around the rotational axis α. In the posture during toner refill (refer to FIGS. 12A and 12B), the flange 603*f* is located above the discharge port 602*a*. For this reason, it is less likely that a foreign particle falls in the vicinity of the discharge port 602*a* and the filler opening 32*a*. The flange 603*f* may be provided separately from the pack-side shutter 603.

FIGS. 3A and 5A illustrate the pack-side shutter 603 in the covering position. FIGS. 3B and 6A illustrate the pack-side shutter 603 in the uncovering position. As illustrated in FIGS. 3A and 5A, when the pack-side shutter 603 in the covering position is rotated about the rotational axis α in the direction of arrow K, the pack-side shutter 603 reaches the uncovering position illustrated in FIGS. 3B and 6A. In contrast, when the pack-side shutter 603 in the uncovering position is rotated in the direction of arrow L, the pack-side shutter 603 reaches the covering position. During the rotational movement of the pack-side shutter 603, the pack-side shutter 603 slides on the side surface 602*c* of the nozzle 602 via the pack-side seal 605.

Mounting Unit

Figure 7A:
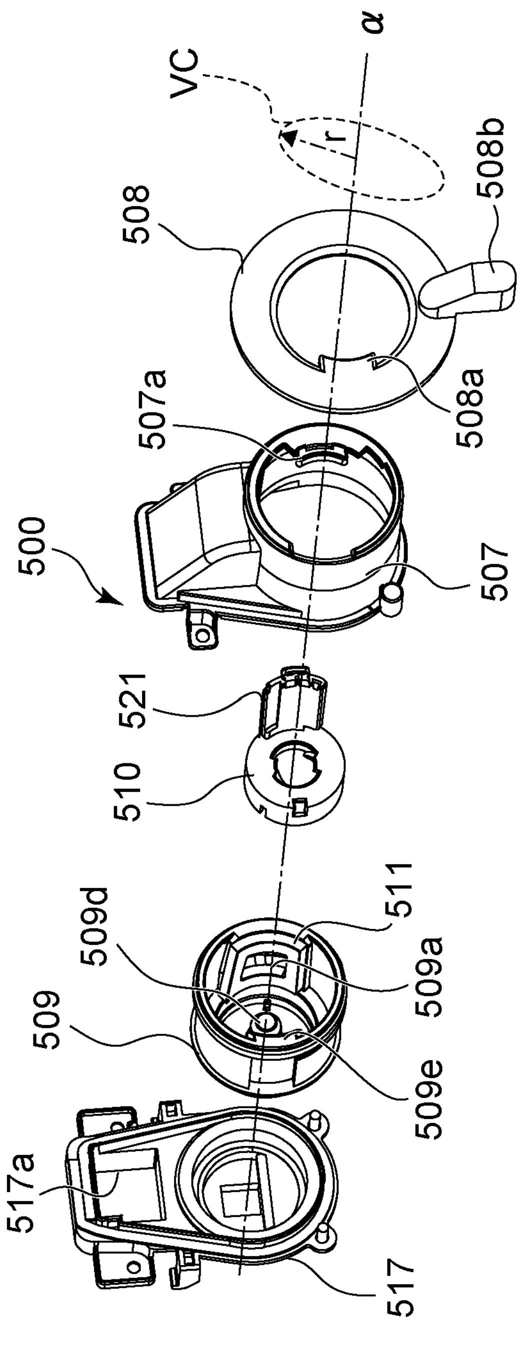
FIGS. 7A and 7B are exploded perspective views of a mounting unit according to the first embodiment.
Figure 7B:
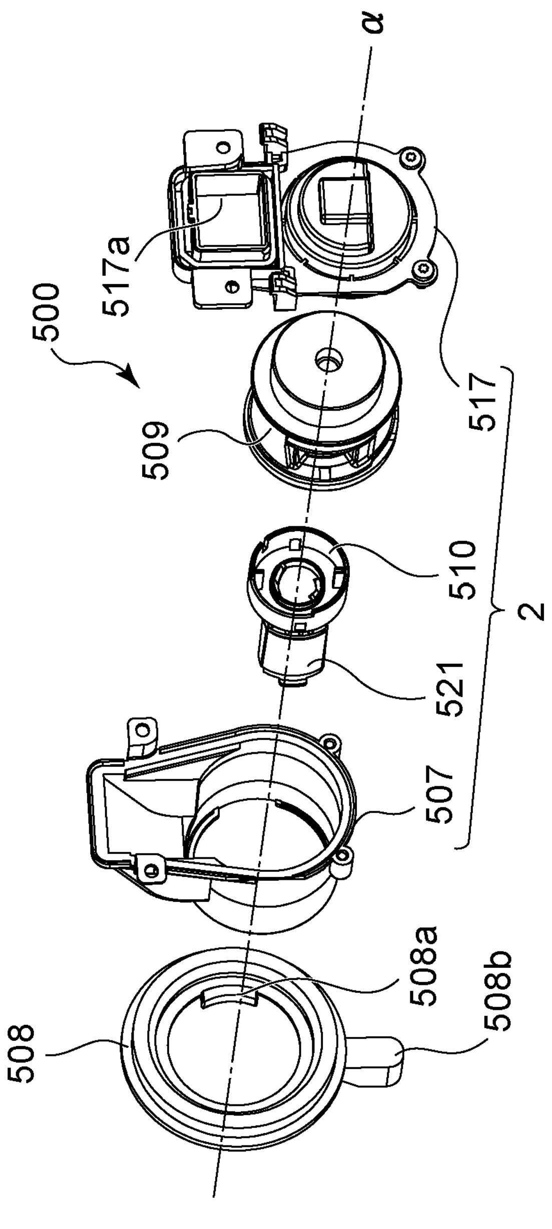
Figure 8A:
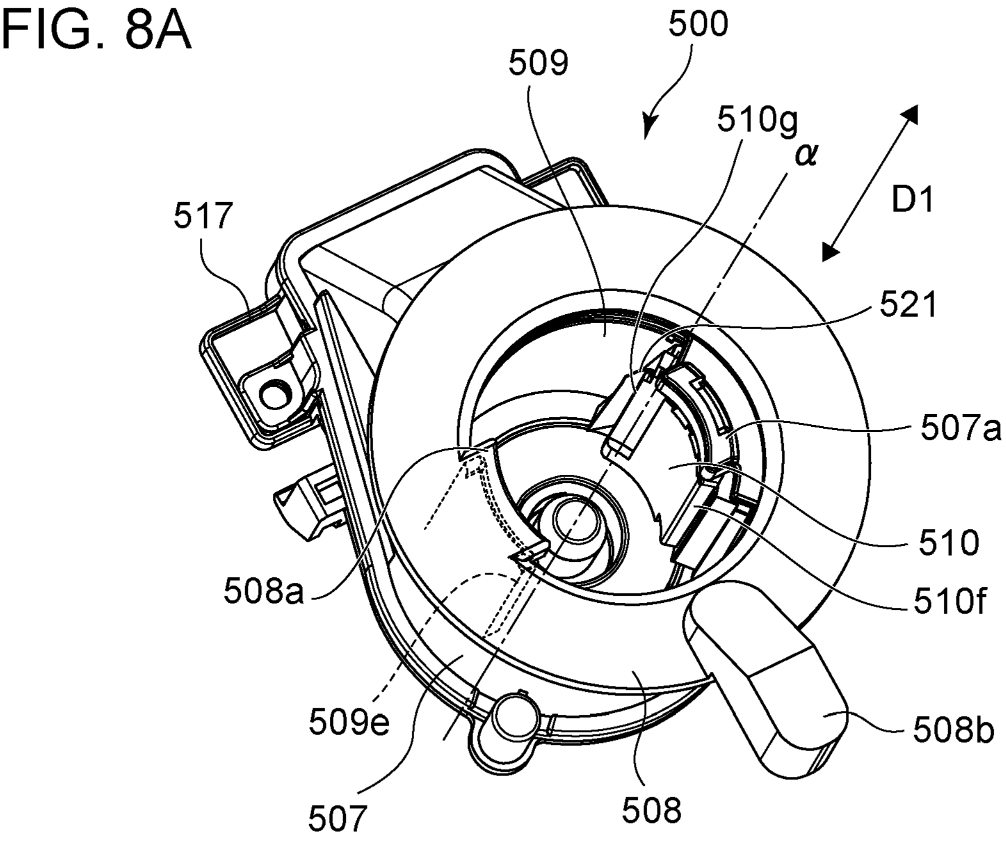
FIGS. 8A and 8B are perspective views of the mounting unit according to the first embodiment.
Figure 8B:
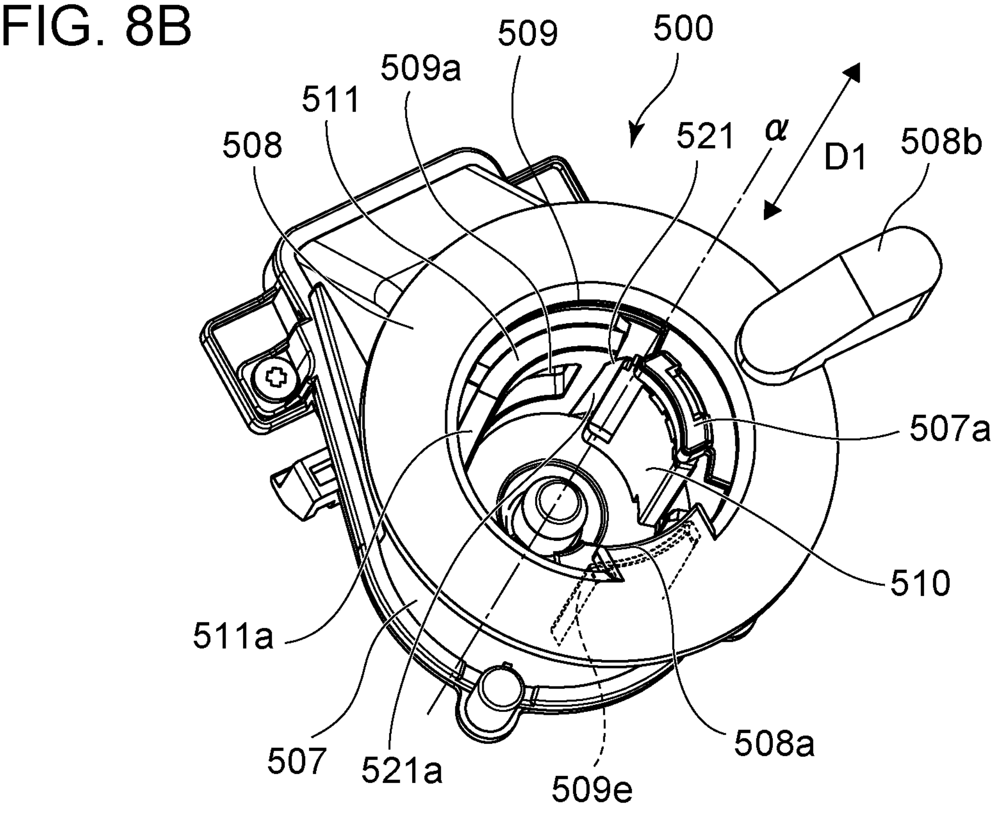
Figure 9A:
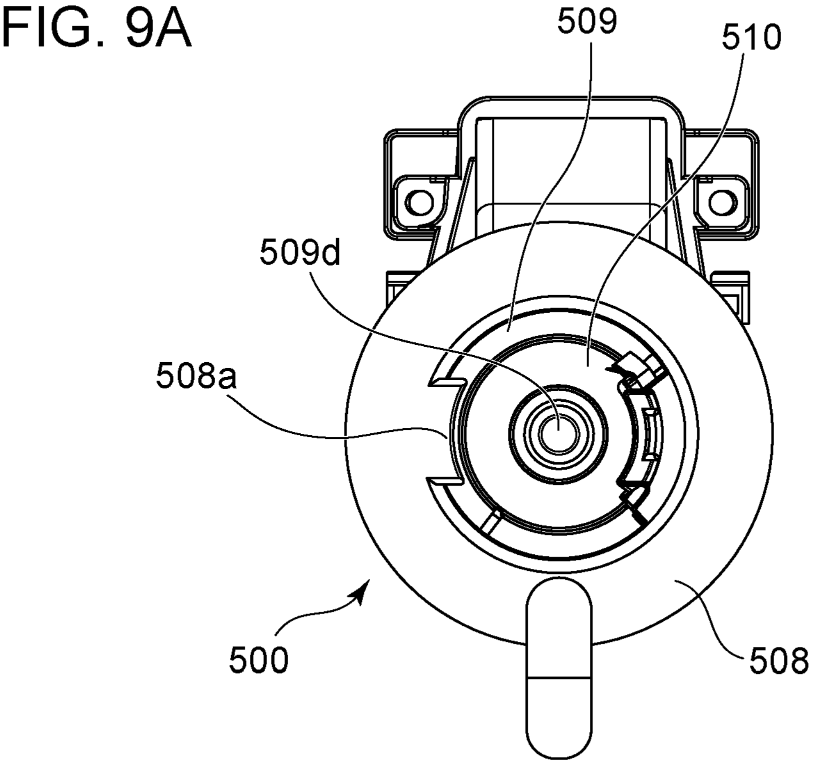
FIGS. 9A and 9B are plan views of the mounting unit according to the first embodiment.
Figure 9B:
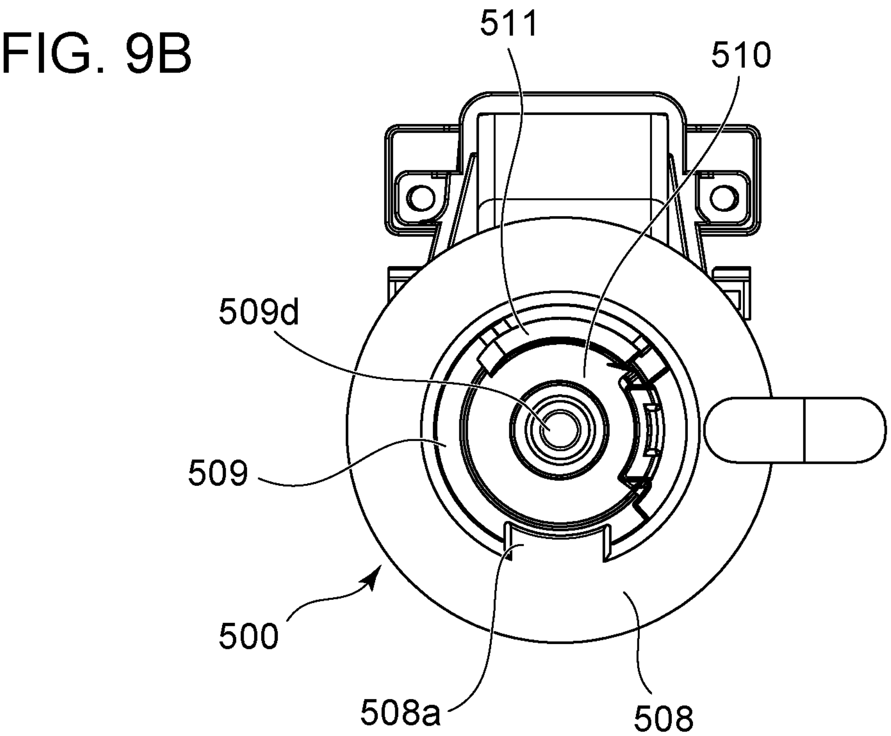

The configuration of the mounting unit 500 to which the toner pack 600 is mounted is described below with reference to FIGS. 7A to 11B. According to the present embodiment, the mounting unit 500 is a unit for mounting the toner pack 600 and is provided in the image forming apparatus 1 (refer to FIG. 2). FIG. 7A is an exploded perspective view of the mounting unit 500. FIG. 7B is an exploded perspective view of the mounting unit 500 viewed in a different direction than in FIG. 7A. FIGS. 8A and 9A are a perspective view of the external appearance of the mounting unit 500 and a view of the mounting unit 500 as viewed in a mounting direction M when a lever 508 is in the closed position, respectively. FIGS. 8B and 9B are a perspective view of the external appearance of the mounting unit 500 and a view of the mounting unit 500 as viewed in the mounting direction M when the lever 508 is in the open position, respectively.

Figure 10A:
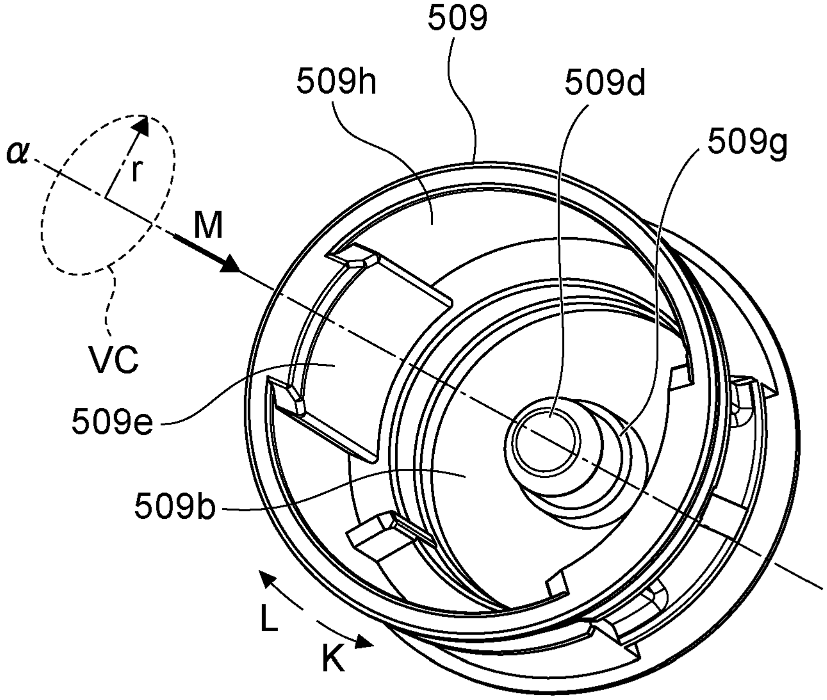
FIGS. 10A and 10B are perspective views of an apparatus-side shutter of the mounting unit according to the first embodiment.

FIG. 10A is a perspective view of an apparatus-side shutter 509 viewed from the upstream in the mounting direction M.

Figure 10B:
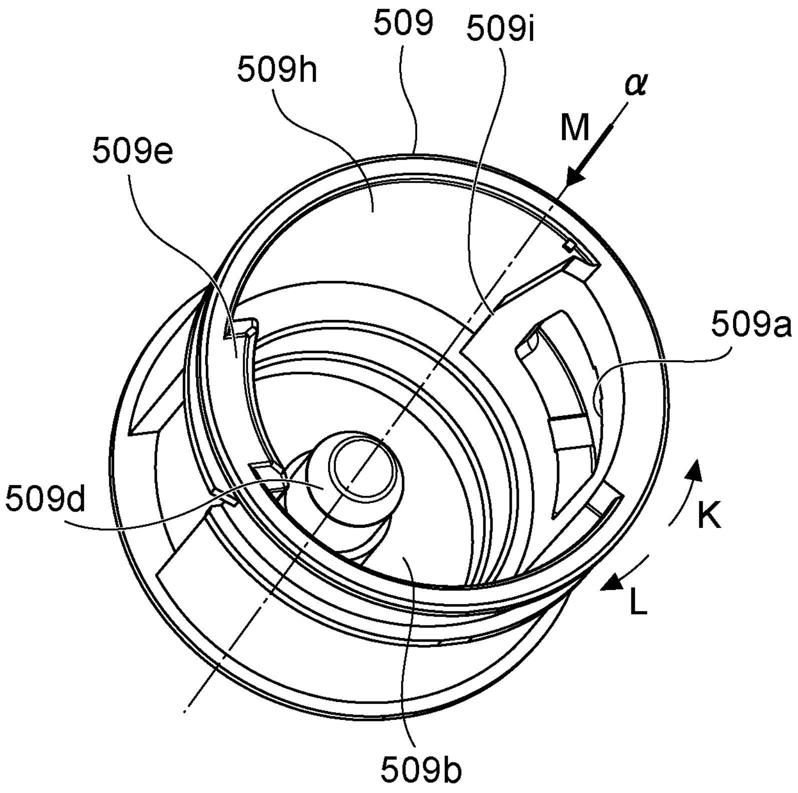

FIG. 10B is a perspective view of the apparatus-side shutter 509 as viewed from a different angle than in FIG. 10A.

Figure 11A:
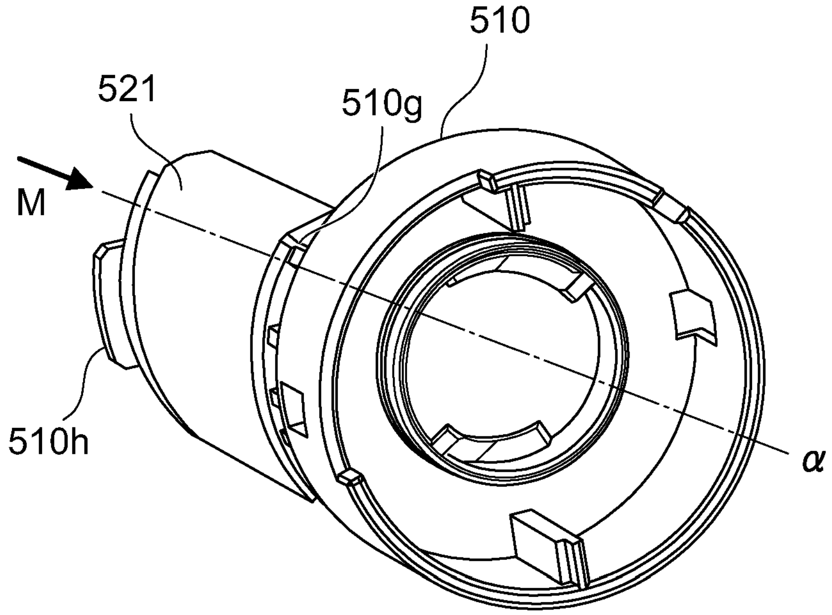
FIGS. 11A and 11B are perspective views of a cover and a shutter sheet of the mounting unit according to the first embodiment.
Figure 11B:
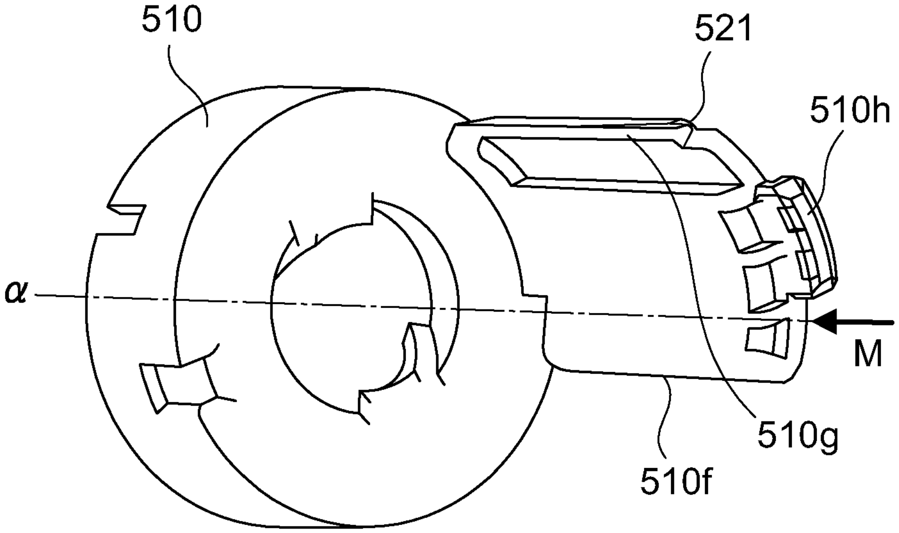

FIG. 11A is a perspective view of a cover 510 and a shutter sheet 521 as viewed from the downstream in the mounting direction M. FIG. 11B is a perspective view of the cover 510 as viewed from the upstream in the mounting direction M.

As illustrated in FIGS. 7A to 8B, the mounting unit 500 includes a body base 2. The body base 2 includes a first frame 507, a second frame 517, the cover 510, and the shutter sheet 521. The cover 510 and the second frame 517 are fixed to the first frame 507. As illustrated in FIGS. 11A and 11B, the cover 510 includes an engaged portion 510*h* that is engaged with a positioning portion 507*a* (refer to FIG. 7A) of the first frame 507 to prevent rotation about the rotational axis α relative to the first frame 507. The first frame 507, the cover 510, and the second frame 517 may be configured as an integrated member rather than as separate members. As illustrated in FIGS. 7A and 7B, the second frame 517 has an apparatus-side opening 517*a* serving as a receiving port, and the apparatus-side opening 517*a* communicates with the storage portion 36 (refer to FIG. 1A) of the development container 32.

The lever 508 and the apparatus-side shutter 509 are each mounted on the body base 2 in a rotatable manner about the rotational axis α. The first frame 507 includes the positioning portion 507*a*. The positioning portion 507*a* protrudes inwardly from an inner peripheral surface of the first frame 507 centered on the rotational axis α in the radial direction r of the imaginary circle VC centered on the rotational axis α.

The lever 508 includes a drive transmission portion 508*a* and an operation portion 508*b*.

The user can rotate the lever 508 about the rotational axis α relative to the body base 2 by operating the operation portion 508*b*. As illustrated in FIG. 7A, the drive transmission portion 508*a* of the lever 508 is a protrusion protruding inwardly from the inner peripheral surface of the lever 508 centered on the rotational axis α in the radial direction r of the imaginary circle VC centered on the rotational axis α.

As illustrated in FIGS. 10A and 10B, the apparatus-side shutter 509 serving as a body shutter or a second shutter has an inner peripheral surface 509*h*, a communication port 509*a* formed in the inner peripheral surface 509*h* to receive toner from the toner pack 600, and a bottom surface 509*b*. The apparatus-side shutter 509 further has a center boss 509*d*, a driven transmission portion 509*e*, and a pack contact surface 509*g*. As illustrated in FIG. 10A, the driven transmission portion 509*e* is a protrusion protruding inwardly in the radial direction r of the imaginary circle VC centered on the rotational axis α. An apparatus-side seal 511 serving as a second sealing member is affixed to the inner peripheral surface 509*h* so as to surround the communication port 509*a* (refer to FIG. 8B).

The apparatus-side shutter 509 is configured to have a covering position serving as a second covering position and an uncovering position serving as a second uncovering position with respect to the body base 2. More specifically, as illustrated in FIGS. 10A and 10B, the apparatus-side shutter 509 rotates in the direction of arrow K from the covering position to the uncovering position and rotates in the direction of arrow L from the uncovering position to the covering position. The directions of arrow K and arrow L are the same as the directions of arrow K and arrow L in FIG. 5A, which are the rotation directions of the pack-side shutter 603, respectively. In the covering position of the apparatus-side shutter 509, the communication port 509*a* is covered by the apparatus-side seal 511 and the cover 510, and in the uncovering position, the communication port 509*a* is not covered by the cover 510 and is open. That is, when the apparatus-side shutter 509 is in the covering position, the communication port 509*a* does not communicate with the apparatus-side opening 517*a* of the second frame 517. When the apparatus-side shutter 509 is in the uncovering position, the communication port 509*a* communicates with the apparatus-side opening 517*a* of the second frame 517.

As illustrated in FIG. 8B, an end surface 511*a* of the apparatus-side seal 511 is disposed so as to protrude, in the circumferential direction, from an end surface 509*i* (refer to FIG. 10B) around the communication port 509*a* (the end surface 509*i* is an affixing seat surface). The end surface 511*a* is a sloping surface.

The apparatus-side shutter 509 is in the covering position in FIGS. 8A and 9A. At this time, the communication port 509*a* of the apparatus-side shutter 509 does not communicate with the apparatus-side opening 517*a* of the second frame 517. In addition, the apparatus-side shutter 509 is in the uncovering position in FIGS. 8B and 9B. At this time, the communication port 509*a* of the apparatus-side shutter 509 communicates with the apparatus-side opening 517*a* of the second frame 517. By moving the apparatus-side shutter 509 to the uncovering position, the storage portion 36 of the development container 32 can be refilled (supplied) with toner from the toner pack 600 through the communication port 509*a*.

Since the lever 508 and the apparatus-side shutter 509 are not driven in conjunction with each other, the apparatus-side shutter 509 does not rotate even if the lever 508 is operated when the toner pack 600 is not mounted.

The shutter sheet 521 serving as the sheet member illustrated in FIGS. 8A and 8B and FIGS. 11A and 11B is a film having a thickness of about 100 μm and is fixed to the cover 510 with two-sided adhesive tape or the like.

The shutter sheet 521 slides on the apparatus-side seal 511 attached to the apparatus-side shutter 509 when the apparatus-side shutter 509 rotates between the covering and uncovering positions.

Mounting of Toner Pack on Mounting Unit

Figure 12A:
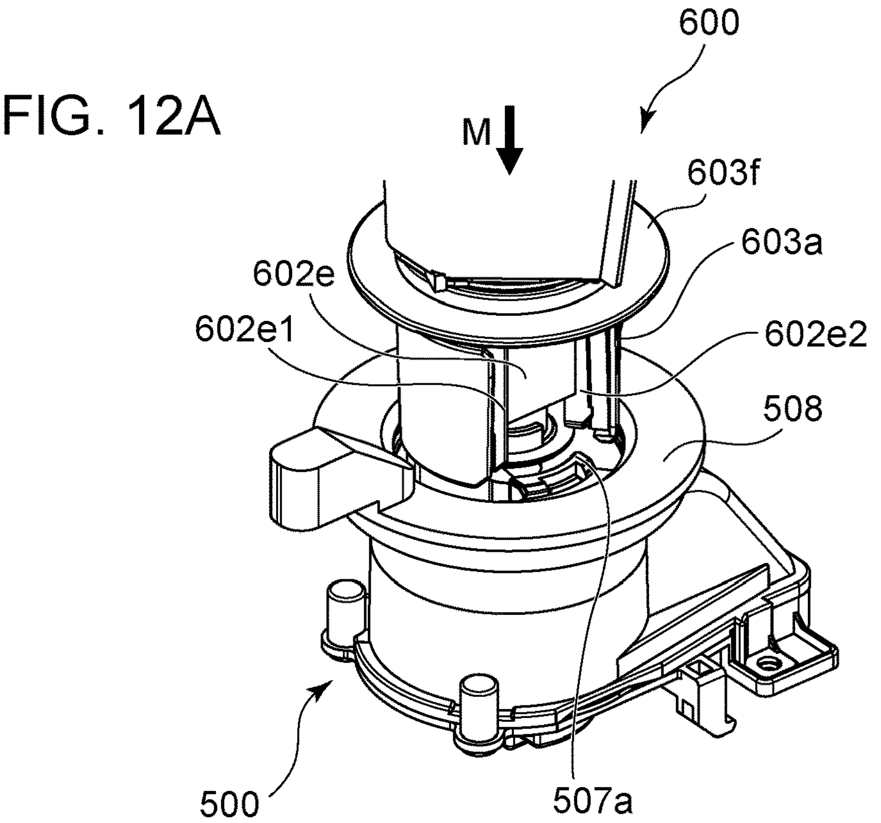
FIGS. 12A and 12B are perspective views of the toner pack being mounted on the mounting unit according to the first embodiment.
Figure 12B:
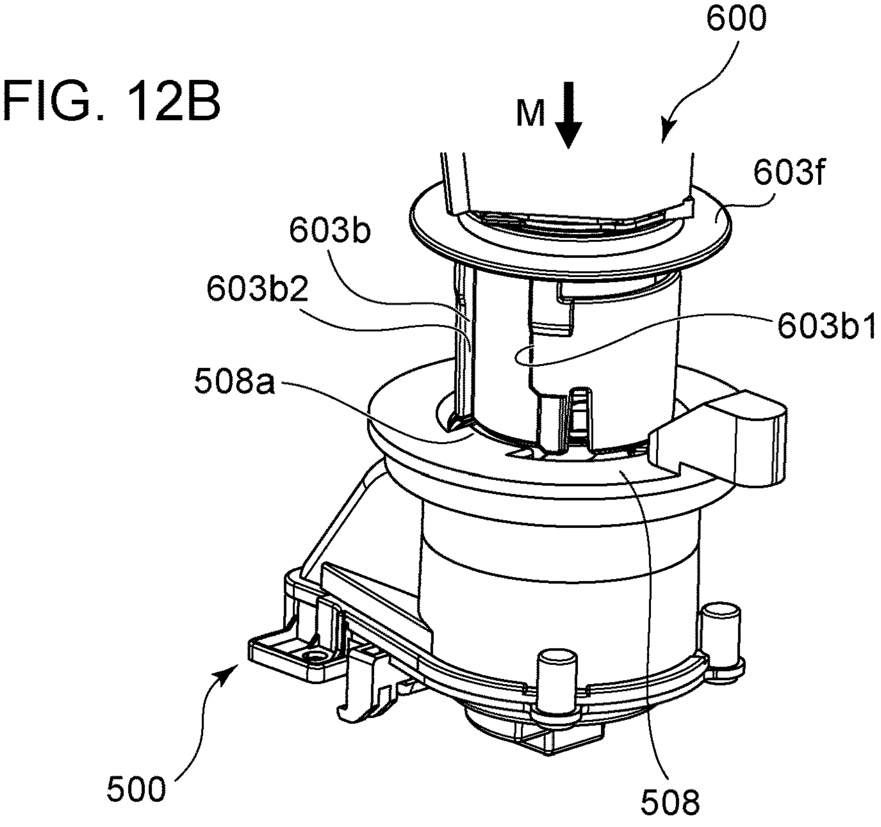
Figure 13:
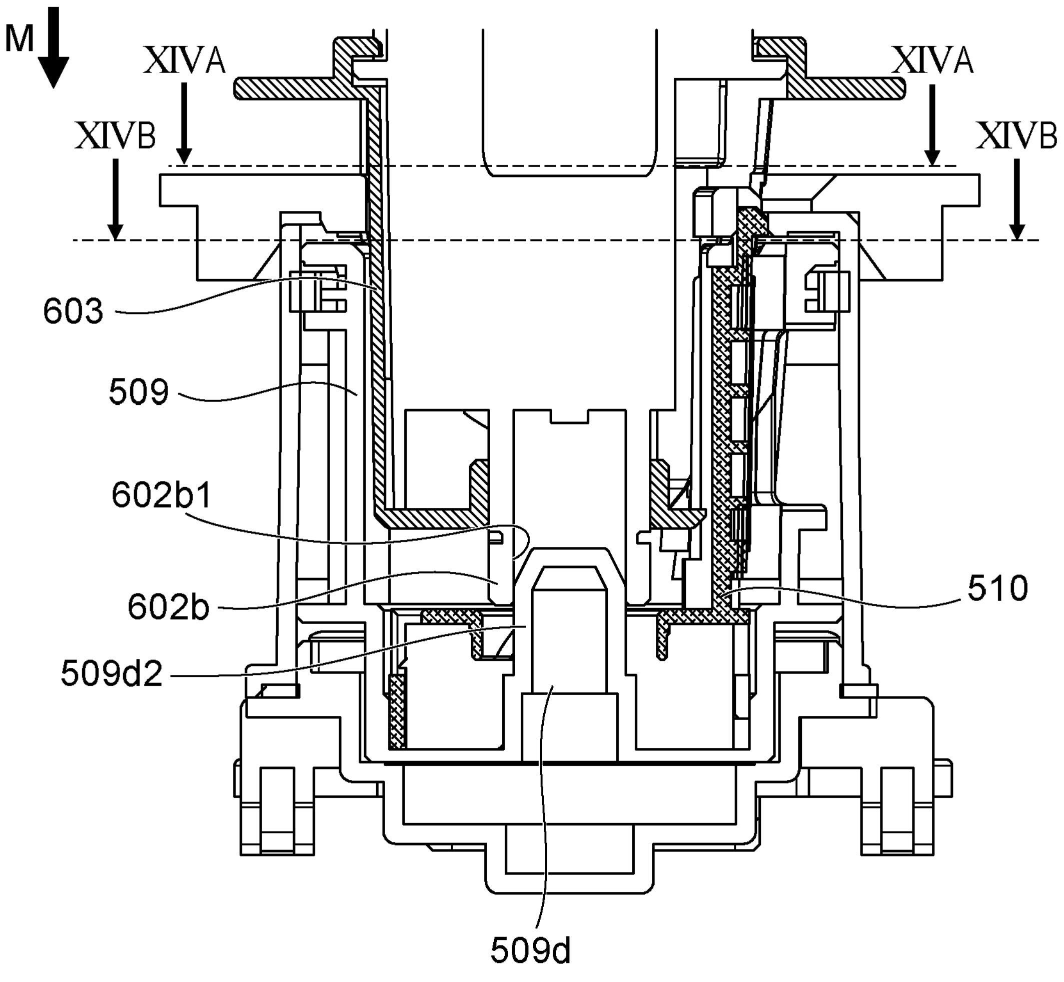
FIG. 13 is a cross-sectional view of the toner pack being mounted on the mounting unit according to the first embodiment.
Figure 14A:
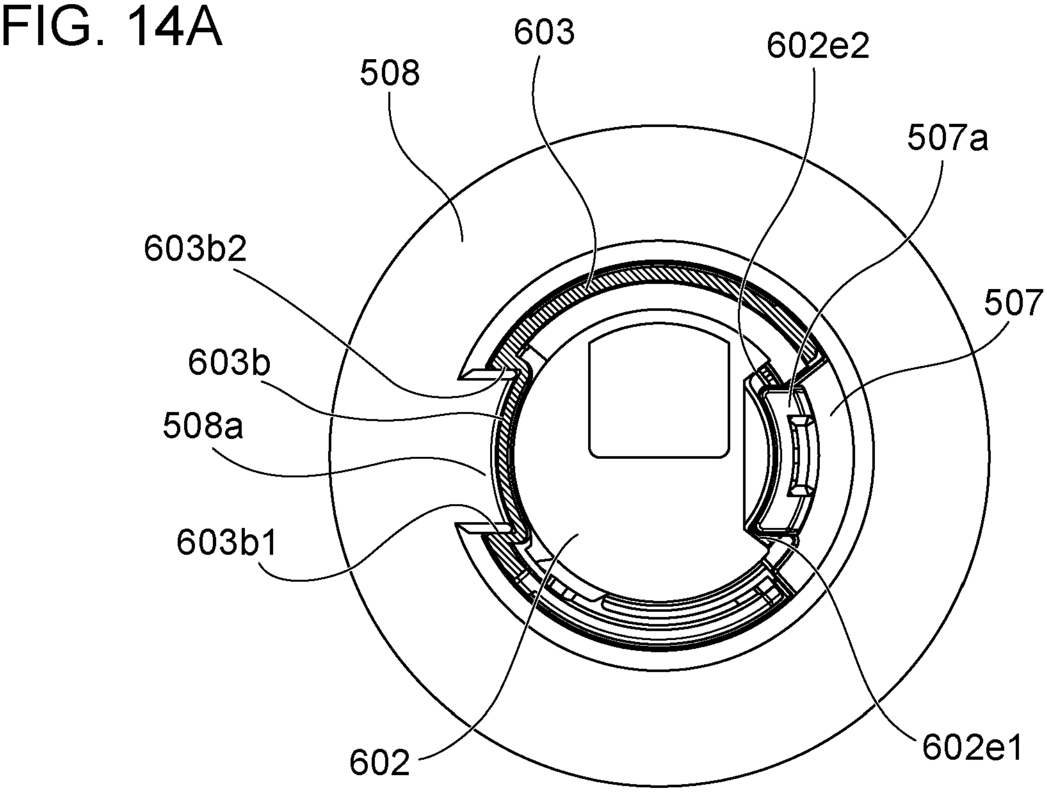
FIG. 14A is a cross-sectional view of the toner pack and the mounting unit taken along line XIVA-XIVA of FIG. 13.
Figure 14B:
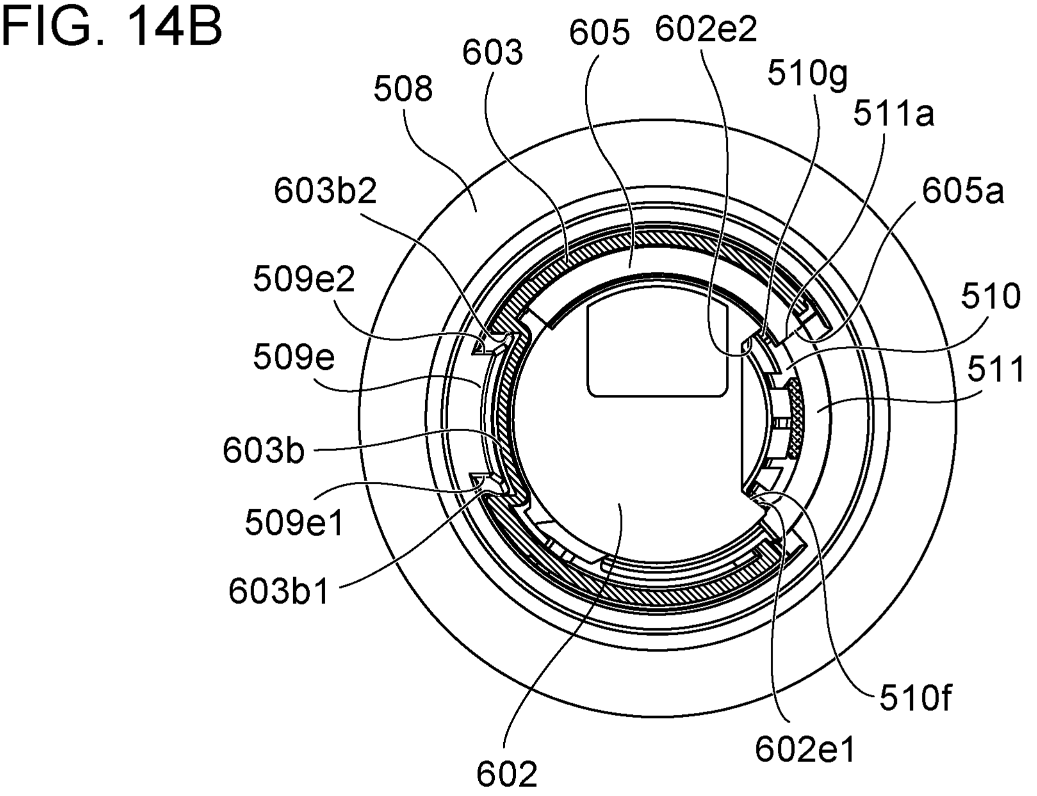
FIG. 14B is a cross-sectional view taken along line XIVB-XIVB of FIG. 13.

How to mount the toner pack 600 on the mounting unit 500 is described with reference to FIGS. 12A to 14B. FIGS. 12A and 12B are perspective views of the toner pack 600 being mounted on the mounting unit 500 as viewed from different angles. FIG. 13 is a cross-sectional view that is parallel to the rotational axis α when the toner pack 600 is further moved from the position illustrated in FIGS. 12A and 12B in the mounting direction. FIG. 14A is a cross-sectional view taken along line XIVA-XIVA of FIG. 13. FIG. 14B is a cross-sectional view taken along line XIVB-XIVB of FIG. 13. For ease of viewing, in FIGS. 13 to 14B, the cut surfaces of the pack-side shutter 603 and the cover 510 are hatched.

In the following description, as illustrated in FIGS. 12A and 12B, the user moves the toner pack 600 with the pack-side shutter 603 in the covering position in a mounting direction M relative to the mounting unit 500 with the apparatus-side shutter 509 in the covering position. At this time, the end surface 511*a* of the apparatus-side seal 511 and the end surface 605*a* of the pack-side seal 605 are brought into contact with each other while overlapping each other in the circumferential direction and slide while being deformed in the mounting direction M. That is, the end surface 605*a* of the pack-side seal 605 is brought into contact with the end surface 511*a* of the apparatus-side seal 511 when the toner pack 600 is mounted on the body base 2.

Since the end surface 605*a* of the pack-side seal 605 protrudes into the opening 603*a* of the pack-side shutter 603, the end surfaces 605*a* and 511*a* are brought into pressure contact with each other when the toner pack 600 is mounted on the body base 2. As a result, the pack-side seal 605 and the apparatus-side seal 511 are in tight contact with each other, which improves sealing performance and reduces toner leakage. Since the end surfaces 605*a* and 511*a* extend toward the direction of the rotational axis α (the axial direction D1) while heading toward the rotation direction of the pack-side shutter 603 (arrow K, L), the resistance during mounting of the toner pack 600 onto the mounting unit 500 can be reduced. As a result, the toner pack 600 can be mounted smoothly on the mounting unit 500, which improves the operability.

The user aligns the recess 602*e* of the nozzle 602 and the opening 603*a* of the pack-side shutter 603 with the positioning portion 507*a* of the first frame 507. At the same time, the user aligns the driven transmission portion 603*b* of the pack-side shutter 603 with the drive transmission portion 508*a* of the lever 508.

After aligning the toner pack 600 with the mounting unit 500, the user moves the toner pack 600 in the mounting direction M and mounts the toner pack 600 on the mounting unit 500. Then, as illustrated in FIG. 13, a small diameter portion 509*d*2 of the center boss 509*d* of the apparatus-side shutter 509 is fitted into an inner peripheral surface 602*b*1 of a protrusion 602*b* of the nozzle 602. This operation determines the position of the nozzle 602 relative to the apparatus-side shutter 509 in the radial direction. In addition, since the front end of the protrusion 602*b* of the nozzle 602 is brought into contact with the pack contact surface 509*g* of the apparatus-side shutter 509, the position of the toner pack 600 in the mounting direction M is determined.

At this time, as illustrated in FIG. 14B, end surfaces 510*f* and 510*g* of the cover 510 are in close vicinity of or are engaged with surfaces 602*e*1 and 602*e*2 that form the recess 602*e* of the nozzle 602.

As illustrated in FIGS. 14A and 14B, the driven transmission portion 603*b* of the pack-side shutter 603 engages with the driven transmission portion 509*e* of the apparatus-side shutter 509 and the drive transmission portion 508*a* of the lever 508. As a result, the rotational axis of the pack-side shutter 603 and the rotational axis of the apparatus-side shutter 509 are substantially coaxial (the rotational axis α). Since surfaces 602*e*1 and 602*e*2 of the recess 602*e* of the nozzle 602 engage with the end surfaces 510*f* and 510*g* of the cover 510, respectively, the nozzle 602 of the toner pack 600 does not rotate relative to the body base 2 including the cover 510. That is, the recess 602*e* serving as an engaging portion engages with the cover 510 serving as an engaged portion of the image forming apparatus 1 when the toner pack 600 is mounted on the image forming apparatus 1 and, thus, rotation of the nozzle 602 relative to the image forming apparatus 1 is regulated.

The lever 508, the pack-side shutter 603, and the apparatus-side shutter 509 can then rotate in a substantially integrated fashion about the rotational axis α relative to the body base 2 and the nozzle 602.

For example, when the lever 508 is rotated from the closed position to the open position, the drive transmission portion 508*a* serving as a second engaging portion of the lever 508 presses a surface 603*b*1 serving as a first engaged portion of the pack-side shutter 603. As a result, the pack-side shutter 603 is rotated together with the lever 508 from the covering position to the uncovering position. In addition, a surface 603*b*2 serving as a first engaging portion of the pack-side shutter 603, which is rotated from the covering position to the uncovering position, presses a surface 509*e*2 serving as a second engaged portion of the apparatus-side shutter 509. As a result, the apparatus-side shutter 509 is rotated from the covering position to the uncovering position together with the pack-side shutter 603.

When the lever 508 is rotated from the open position to the closed position, the drive transmission portion 508*a* of the lever 508 presses the surface 603*b*2 of the pack-side shutter 603. As a result, the pack-side shutter 603 is rotated from the uncovering position to the covering position together with the lever 508. In addition, the surface 603*b*1 of the pack-side shutter 603, which is rotated from the uncovering position to the covering position, presses a surface 509*e*1 of the driven transmission portion 509*e* of the apparatus-side shutter 509. As a result, the apparatus-side shutter 509 is rotated from the uncovering position to the covering position together with the pack-side shutter 603.

As described above, by operating the lever 508, the user can rotate the pack-side shutter 603 and the apparatus-side shutter 509 between the covering position and the uncovering position to refill the development container 32 with toner in the toner pack 600. When the user has finished the toner refill from the toner pack 600 to the development container 32, the user rotates the lever 508 from the open position to the closed position and pulls out the toner pack 600 from the mounting unit 500.

When the pack-side shutter 603 and the apparatus-side shutter 509 rotate, the end surfaces 511*a* of the apparatus-side seal 511 and the end surface 605*a* of the pack-side seal 605 are in tight contact with each other and do not form a gap, which prevents the entrance of toner.

Groove of Pack-Side Shutter

As illustrated in FIG. 6A, the pack-side shutter 603 has, formed therein, a groove 603*h* extending in the circumferential direction, that is, in the direction of rotation of the pack-side shutter 603 (arrows K and L, refer to FIG. 5A). As described above, when the toner pack 600 is mounted in the mounting unit 500 and, thereafter, the lever 508 is rotated from the closed position illustrated in FIG. 8A to the open position illustrated in FIG. 8B, the drive transmission portion 508*a* of the lever 508 enters the groove 603*h* of the pack-side shutter 603. When the drive transmission portion 508*a* enters the groove 603*h*, the drive transmission portion 508*a* is caught by the toner pack 600 and, thus, the toner pack 600 is restricted from being pulled out of the mounting unit 500.

Thus, once the toner refill from the toner pack 600 to the development container 32 begins, the toner pack 600 is prevented from moving from the mounting unit 500 in a direction opposite the mounting direction M, thus preventing the toner from leaking outside the image forming apparatus 1.

As illustrated in FIG. 6A, a tapered portion 603*i* is formed at an entrance portion of the groove 603*h* so as to have a tapered shape that is inclined with respect to the circumferential direction and the axial direction D1. That is, the tapered portion 603*i* extends toward the direction of the rotational axis α (the axial direction D1) while heading toward the direction of rotation of the pack-side shutter 603 (the direction of arrow K or L). When the user mounts the toner pack 600 on the mounting unit 500, the tapered portion 603*i* allows the user to easily insert the drive transmission portion 508*a* into the groove 603*h* even if the toner pack 600 is slightly displaced from the mounting direction M. When the toner pack 600 is pulled out from the mounting unit 500, the drive transmission portion 508*a* of the lever 508 is brought into contact with the tapered portion 603*i* if the rotational movement of the lever 508 to the closed position is insufficient. In this case, if the user pulls out the toner pack 600 from the mounting unit 500, the drive transmission portion 508*a* is pressed against the tapered portion 603*i*, causing the lever 508 to rotate to the closed position and returning the lever 508 to the proper position.

As described above, by providing the groove 603*h* and the tapered portion 603*i* in the pack-side shutter 603, the toner pack 600 can be prevented from falling out. In addition, the lever 508 can be easily rotated, and the lever 508 can be returned to the proper closed position. Furthermore, when the toner pack 600 is mounted on the mounting unit 500 again, the operability can be improved by preventing interference of parts or the like.

Details of Pouch

Figure 15A:
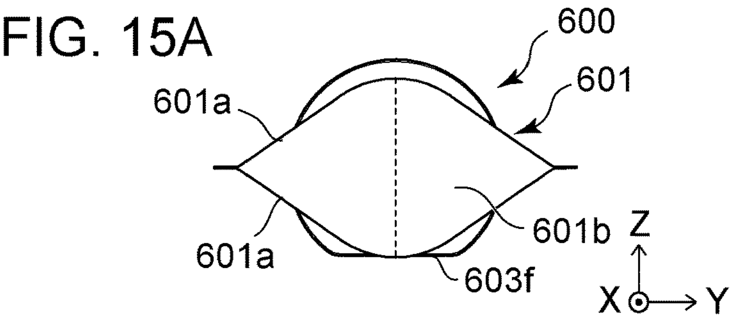
FIG. 15A is a plan view of the toner pack (before cap removal) according to the first embodiment.
Figure 15B:
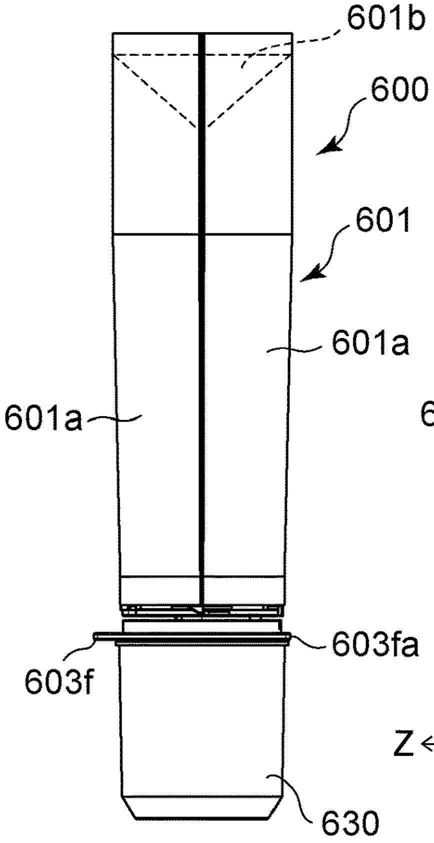
FIG. 15B is a side view of the toner pack.
Figure 15C:
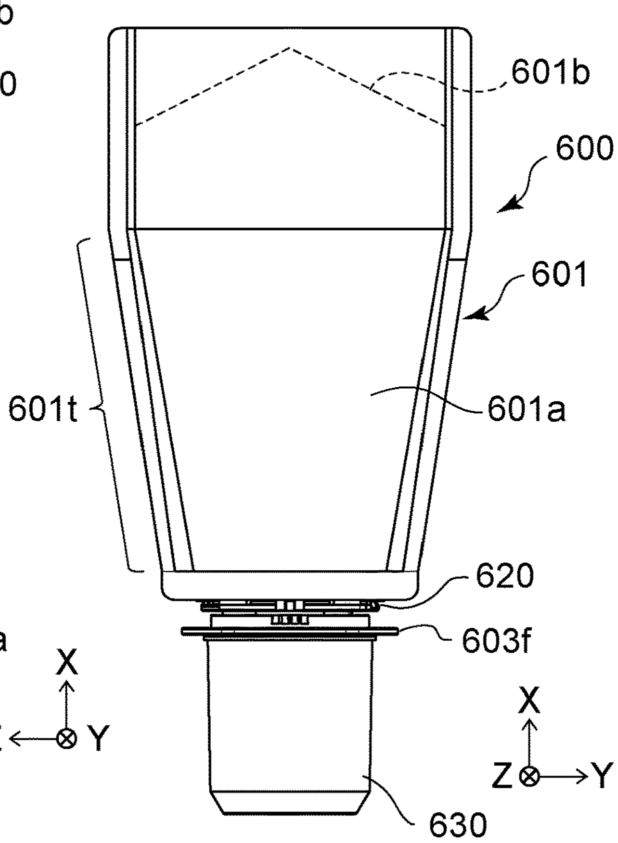
FIG. 15C is a front view of the toner pack.
Figure 15D:
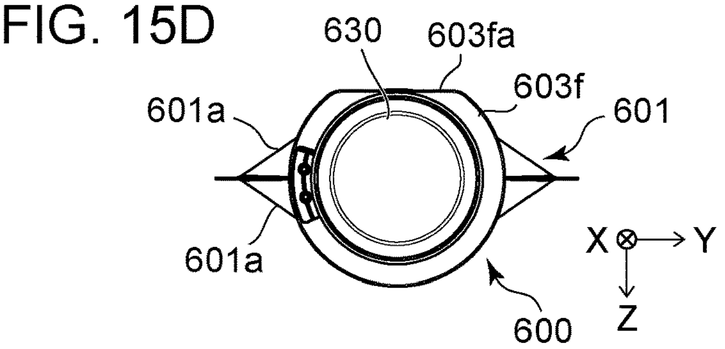
FIG. 15D is a bottom view of the toner pack.

The pouch 601 of the toner pack 600 is described below with reference to FIGS. 15A to 17F. FIGS. 15A to 15D illustrate the toner pack 600 with a protective cap 630 attached to the nozzle unit 610. FIG. 15A is a plan view of the toner pack 600. FIG. 15B is a side view of the toner pack 600. FIG. 15C is a front view of the toner pack 600. FIG. 15D is a bottom view of the toner pack 600. The toner pack 600 illustrated in FIGS. 15A to 22B has substantially the same configuration as the toner pack 600 illustrated in FIGS. 3A to 6B, except for the slightly different shape of the outer ring member 620.

Figure 16A:
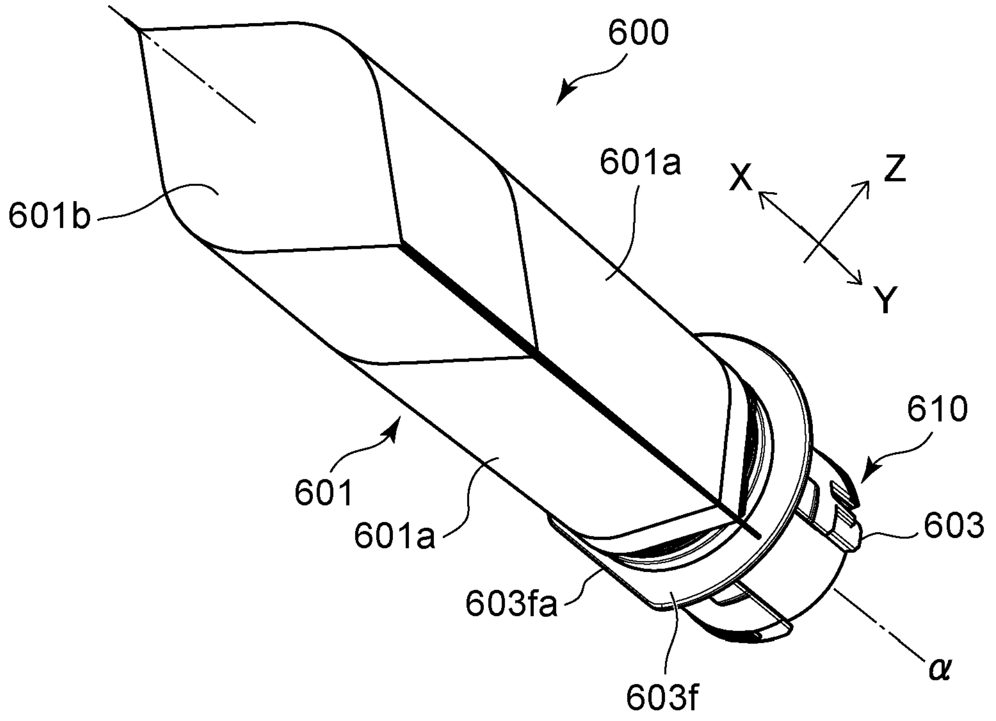
FIGS. 16A and 16B are perspective views of the toner pack according to the first embodiment.
Figure 16B:
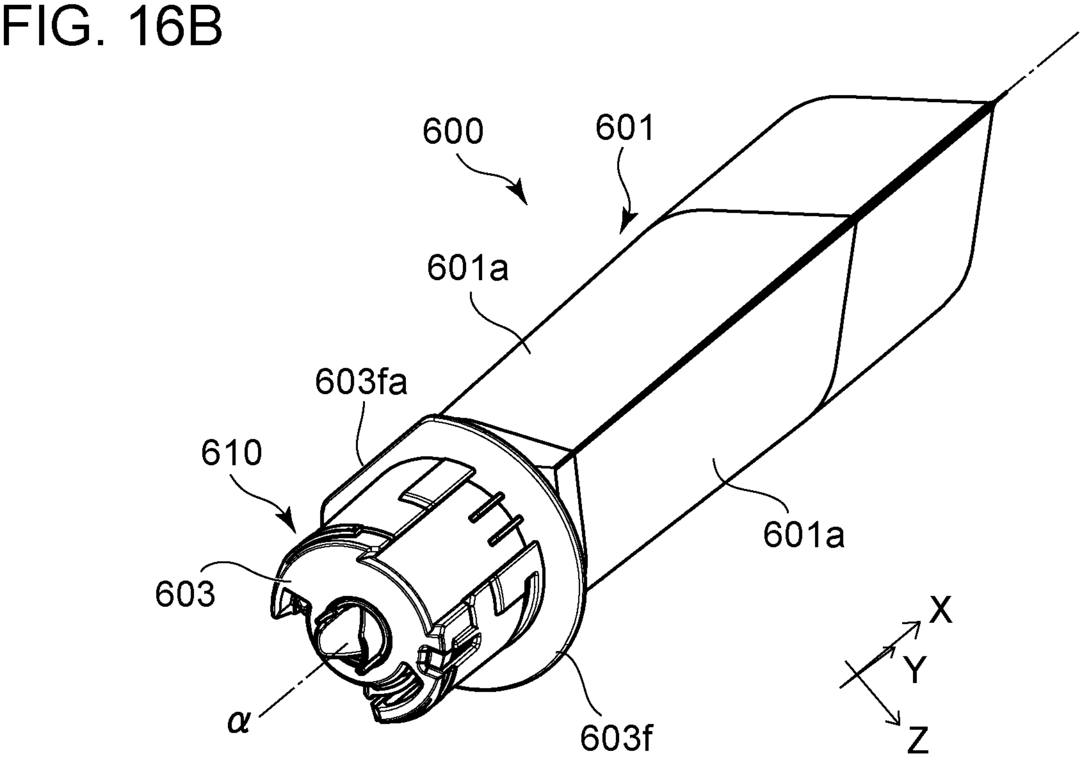
Figures 17A, 17B, 17C, 17D, 17E, 17F:
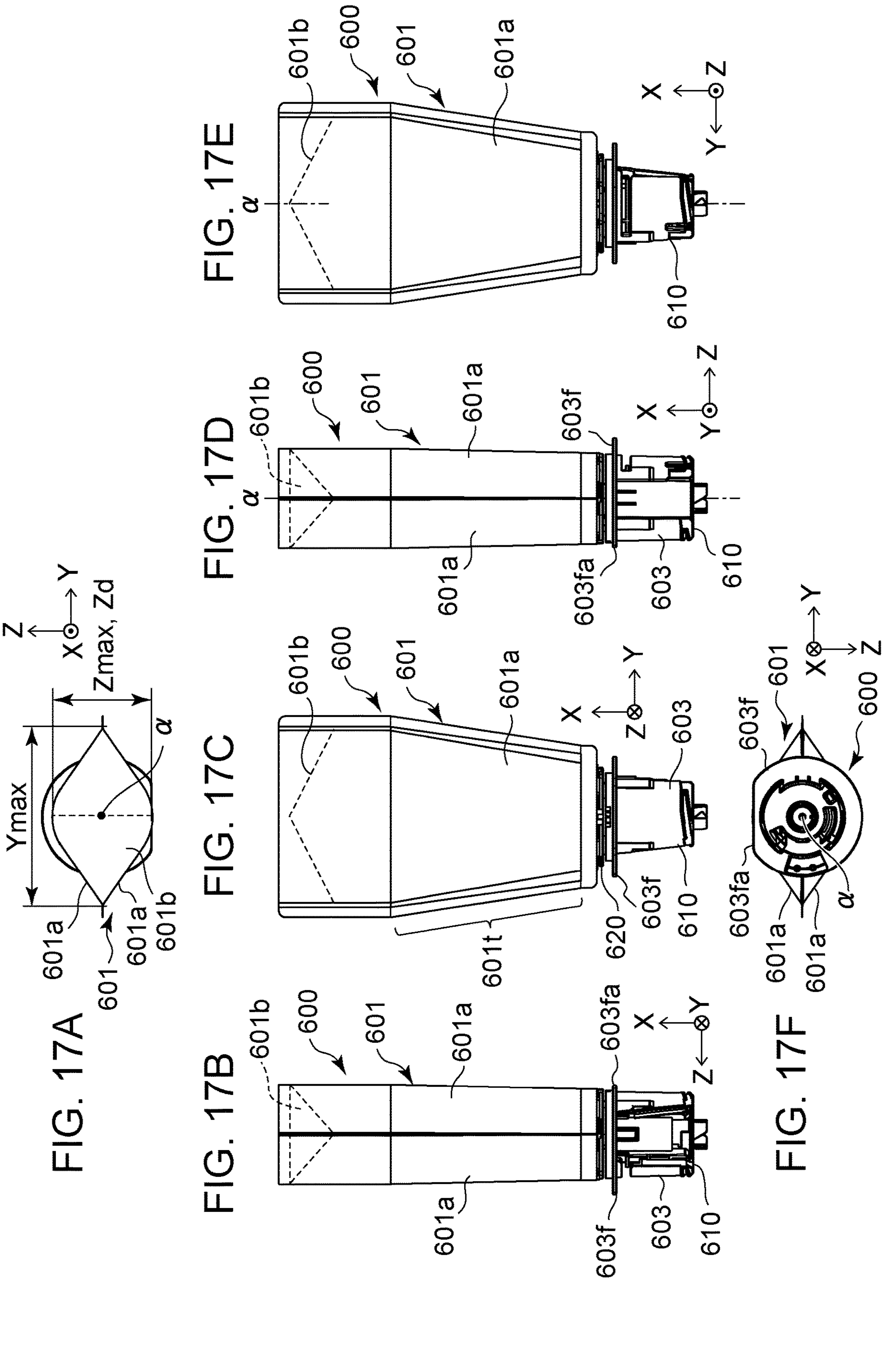
FIG. 17A is a plan view of the toner pack according to the first embodiment.
FIG. 17B is a left side view of the toner pack.
FIG. 17C is a front view of the toner pack.
FIG. 17D is a right side view of the toner pack.
FIG. 17E is a back view of the toner pack.
FIG. 17F is a bottom view of the toner pack.

FIGS. 16A and 16B is a perspective view of the toner pack 600 with the cap 630 removed. FIGS. 17A to 17F are six principal views of the toner pack 600 with the cap 630 removed, according to the third angle projection method. FIG. 17A is a plan view of the toner pack 600. FIG. 17B is a left side view of the toner pack 600. FIG. 17C is a front view of the toner pack 600. FIG. 17D is a right side view of the toner pack 600. FIG. 17E is a back view of the toner pack 600. FIG. 17F is a bottom view of the toner pack 600.

To define the shape of the toner pack 600 and the pouch 601, the following description and drawings use the X-axis direction (a first direction), Y-axis direction (a second direction), and Z-axis direction (a third direction) that are perpendicular to one another. The X-axis direction is a direction from the side with the nozzle unit 610 (the base portion 611) to the side with the pouch 601. The X-axis direction according to the present embodiment is a direction substantially parallel to the axial direction D1 of the rotational axis α of the pack-side shutter 603. The Y-axis direction is the longitudinal direction of the pouch 601 as viewed in the X-axis direction. The Z-axis direction is the transverse direction of the pouch 601 as viewed in the X-axis direction. That is, the toner pack 600 according to the present embodiment has a shape in which the largest length of the pouch 601 in the Y-axis direction is greater than the largest length of the pouch 601 in the Z-axis direction as viewed in the X-axis direction.

As illustrated in FIGS. 15A to 17F, the pouch 601 is a bag body made of a flexible film member (sheet member). The term “flexibility” herein refers to flexibility of a degree that allows the user to easily deform and reduce the volume of the pouch 601 by kneading the pouch 601 with the discharge port 602*a* open, thus facilitating toner discharge. The pouch 601 has a side portion 601*a* consisting of two film members and a bottom portion (a gusset portion, a bottom gusset) 601*b* consisting of one film member. The pouch 601 is formed into a bottomed cylindrical shape by joining the film members together by a technique such as heat welding. A method for manufacturing the pouch 601 is described in more detail below.

The film member of the pouch 601 can be, for example, a polypropylene film having a thickness of greater than or equal to 25 μm and less than or equal to 300 μm. In an example configuration according to the present embodiment, a 110 μm thick polypropylene film is used. The material of the film member is not limited to polypropylene. For example, another synthetic resin, such as polyethylene or polyethylene terephthalate, or paper can be used. Alternatively, the film member can be a laminate material consisting of a base layer of polypropylene or the like and a layer of another material stacked on the base layer. For example, a heat-sealing layer may be provided as the surface layer of a film member (a surface layer to be welded) that softens at a lower temperature than the base layer to enhance weldability. In addition, a barrier layer, such as a metallic vapor deposition film, or a surface layer for enhancing the printability of the exposed surface of the pouch 601 may be provided. Film members of different materials may be used for the side portion 601*a* and the bottom portion 601*b*.

The side portion 601*a* of the pouch 601 is a cylindrical portion extending in the X-axis direction while forming a toner storage space thereinside. That is, the side portion 601*a* of the pouch 601 extends in the first direction to connect the opening 601*a*10 to the bottom portion 601*b* on the opposite side of the opening. The inner surface of the side portion 601*a* forms a storage space for storing toner, and the outer surface opposite the inner surface is a side surface that forms the exterior the user can touch.

The side portion 601*a* according to the present embodiment is formed into a cylindrical shape by joining the side edges of two film members in the Y-axis direction by welding or another technique over the entire region of side edges extending in the X-axis direction. The cross-sectional shape of side portion 601*a* as viewed in the X-axis direction is a spindle shape having the longitudinal direction in the Y-axis direction and the minor axis direction in the Z-axis direction.

The bottom portion 601*b* of the pouch 601 is a portion that seals the toner storage space from one side in the X-axis direction (the first direction). The bottom portion 601*b* according to the present embodiment is formed by joining the rim of one film member to each of the two film members constituting the side portion 601*a* by welding or another technique. The shape of the bottom portion 601*b* as viewed in the X-axis direction is a spindle shape having the longitudinal direction in the Y-axis direction and the minor axis direction in the Z-axis direction.

The nozzle unit 610 is a discharge member for discharging toner in the storage space to the outside. The nozzle unit 610 has a top surface 620*d* (refer to FIG. 18B and FIGS. 20A and 20B) serving as a facing surface that faces the bottom portion 601*b* of the pouch 601 in the X-axis direction. The top surface 620*d* is an end surface of the outer ring member 620 in the X-axis direction and extends in a direction that intersects the X-axis direction. The shape of the top surface 620*d* as viewed in the X-axis direction is a spindle shape having the longitudinal direction in the Y-axis direction and the minor axis direction in the Z-axis direction.

The top surface 620*d* is a surface that is exposed to the storage space in the pouch 601 when the pouch 601 is attached to the nozzle unit 610. That is, the storage space formed by the cylindrical side portion 601*a* is closed by the bottom portion 601*b* from one side in the X-axis direction and is closed by the top surface 620*d* of the nozzle unit 610 from the other side in the X-axis direction. Thus, the storage space inside the pouch 601 is sealed (when the pack-side shutter 603 is closed).

An opening is provided in the center of the top surface 620*d*, and a receiving port 602*f* of the nozzle 602 coupled with the outer ring member 620 is exposed inside the opening. The receiving port 602*f* is an opening that communicates with the discharge port 602*a* via a flow path 602*g* inside the nozzle 602. Accordingly, the nozzle unit 610 is configured to receive toner inside the pouch 601 into the flow path 602*g* through the receiving port 602*f* when the toner pack 600 is mounted on the mounting unit 500 of the printer body 100 and, thereafter, the pack-side and apparatus side shutters are open. The toner that flows into the flow path 602*g* through the receiving port 602*f* is discharged from the discharge port 602*a* and is supplied to the printer body 100 through the filler opening 32*a*, as described above.

According to the present embodiment, the top surface 620*d* (the facing surface) is a flat surface that extends in a direction perpendicular to the X-axis direction. However, the surface shape is not limited thereto. For example, the top surface 620*d* (the facing surface) may be a curved (cone-shaped) surface that is concave toward the discharge port 602*a* in the X-axis direction as the top surface 620*d* extends closer to the rotational axis α (FIGS. 16A and 16B and FIGS. 17A and 17F). Alternatively, for example, when viewed in the Z-axis direction, the top surface 620*d* (the facing surface) may be formed in a V-shape with the center portion in the Y-axis direction concave toward the discharge port 602*a* in the X-axis direction, as compared with the two ends.

As illustrated in FIGS. 15A to 15D, the cap 630 is formed in a bottomed cylindrical shape and is removably attached to the pack-side shutter 603. The outer diameter of the cap 630 is less than the largest outer diameter of the flange 603*f* of the pack-side shutter 603. When the cap 630 is attached to the pack-side shutter 603, most of the region where the nozzle 602 and the pack-side shutter 603 interact with the mounting unit 500 of the printer body 100 (for example, the recess 602*e* and the end surfaces 603*g* and 605*a*) are hidden by the cap 630. As a result, the nozzle unit 610 having the cap 630 attached thereto is protected from damage caused by collision with an object or accidental touching by the user.

As illustrated in FIGS. 15B and 15D, the flange 603*f* of the pack-side shutter 603 includes a linear portion 603*fa*, which is a portion of the circumference of the flange 603*f* cut out by a straight line. When the pack-side shutter 603 is in the covering position, the linear portion 603*fa* is substantially parallel to the Y-axis direction. That is, the shutter according to the present embodiment includes the linear portion linearly extending in the second direction (the Y-axis direction) at a distance from the axis line of the shutter (the rotational axis α) in the third direction (the Z-axis direction). The linear portion 603*fa* makes the X-axis direction substantially horizontal, thus improving the stability of the toner pack 600 when the toner pack 600 is placed on a horizontal surface with the linear portion 603*fa* on the lower side.

Method for Manufacturing Pouch

Figure 18A:
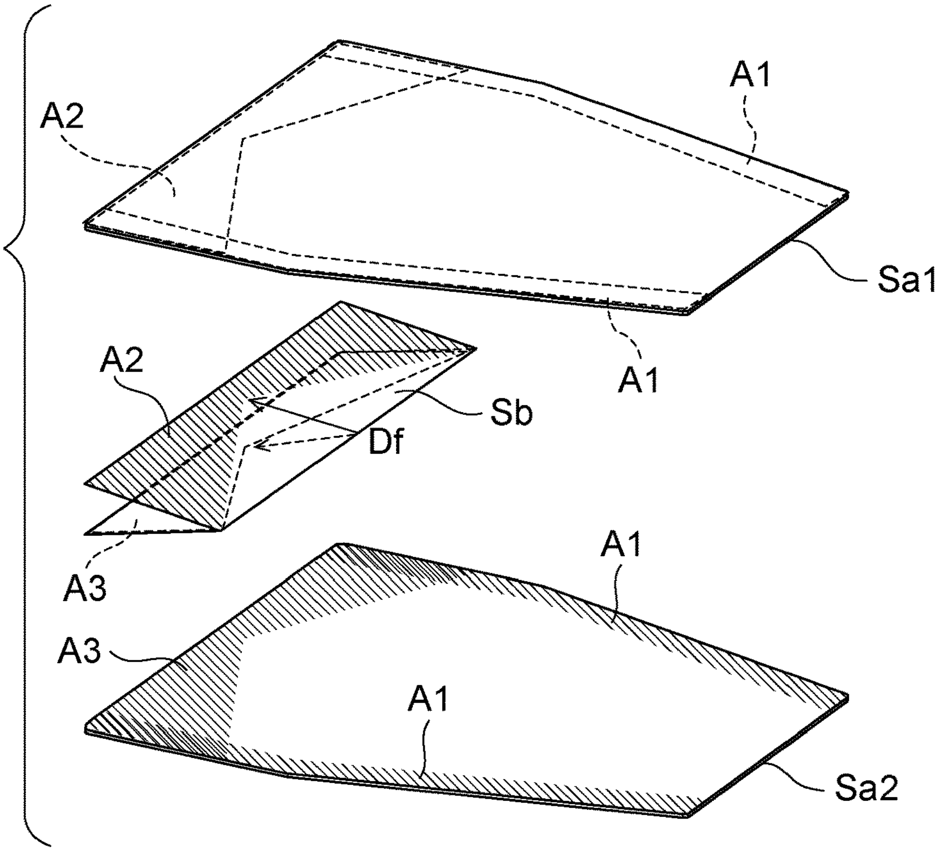
FIGS. 18A and 18B are schematic illustrations of a method for manufacturing the toner pack according to the first embodiment.
Figure 18B:
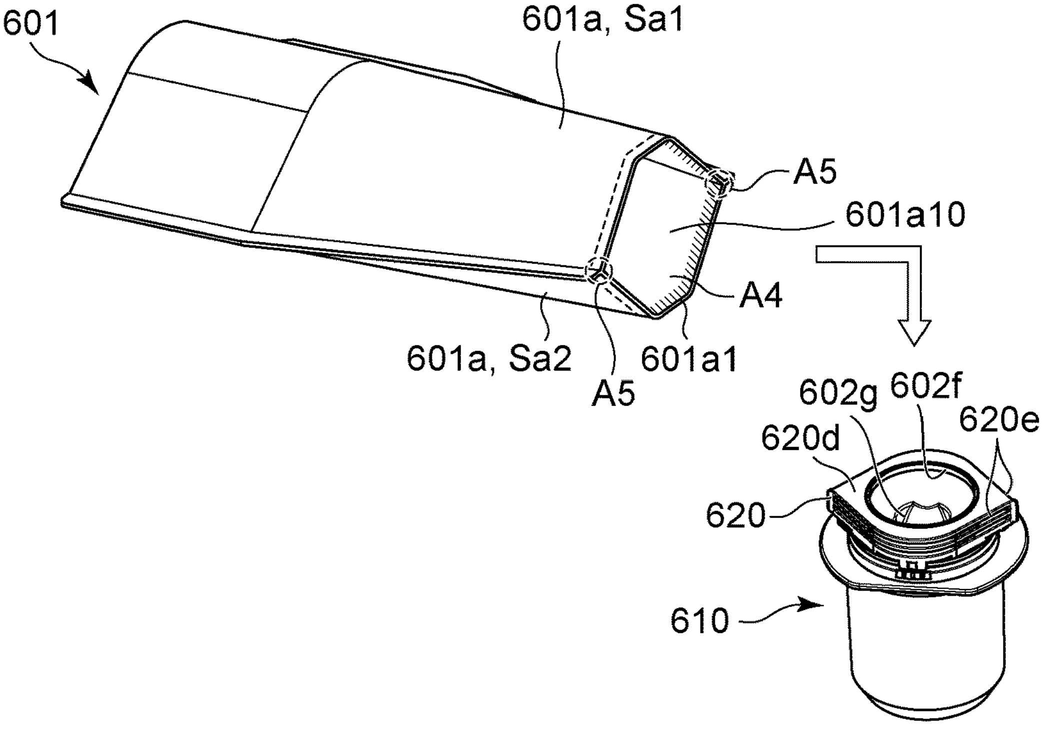

An example of the method for manufacturing the pouch 601 (the bag body) is described below. FIG. 18A is a schematic illustration of the method for manufacturing the pouch 601 (a pouch member) from three original sheets Sa1, Sa2, and Sb. FIG. 18B illustrates a method for coupling the pouch 601 with the nozzle unit 610.

As illustrated in FIG. 18A, the original sheet Sb, which serves as the bottom portion 601*b* of the pouch 601, is folded in two and sandwiched between the two original sheets Sa1 and Sa2, which serve as the side portion 601*a* of the pouch 601. Then, the original sheets Sa1 and Sa2 are welded together in a side edge region A1. In addition, the original sheets Sa1 and Sb are welded in a region A2, and the original sheets Sa2 and Sb are welded in a region A3. Thus, the pouch 601 having a bag shape (a bottomed cylindrical shape) is formed.

In actual pouch making equipment, the original sheets continuously fed from the web roll in the flow direction are sequentially welded to form the bag structure of the pouch 601 and are cut out at positions between adjacent pouches 601 to form individual pouches 601. At this time, the cutting is performed at the positions corresponding to the end edges in the Y-axis direction of the illustrated original sheets Sa1, Sa2, and Sb. Thus, the pouch 601 illustrated in, for example, FIG. 18B is obtained.

The method for manufacturing the pouch 601 having a bag shape (a bottomed cylindrical shape) from at least one film member (an original sheet) is not limited thereto. For example, a sheet for a side gusset may be interposed between the original sheets Sa1 and Sa2.

When the original sheets Sa1, Sa2, and Sb are welded in the regions A2 and A3 illustrated in FIGS. 18A and 18B, the bottom portion 601*b* of the pouch 601 makes a mountain-like shaped surface with the center in the Y-axis direction protruding as illustrated in FIGS. 15A to 15C. However, the shape of the bottom portion 601*b* is not limited thereto, and the shape of the bottom portion 601*b* can be changed by changing the shape and arrangement of the regions A2 and A3 where the side portion 601*a* and the bottom portion 601*b* are welded. For example, in the original sheet Sb that makes the bottom portion 601*b* of the pouch 601, the size of the bottom portion 601*b* of the pouch 601 in the Z-axis direction increases with increasing distance from the region A2, which is welded to one original sheet Sa1, to the region A3, which is welded to the other original sheet Sa2, measured along a direction Df perpendicular to the fold line. That is, the shape of the manufactured pouch 601 can be controlled by changing the regions A1 to A3 where the original sheets Sa1, Sa2, and Sb are welded when the pouch 601 is manufactured.

As illustrated in FIG. 18B, the pouch 601 is formed to have a bag-like shape (a bottomed cylindrical shape) that is open toward the opposite side of the bottom portion 601*b* in the X-axis direction, and the opening edge 601*a*1 of the side portion 601*a* is coupled with the outer ring member 620 of the nozzle unit 610. That is, the nozzle unit 610 serving as the discharge member is coupled with the side of the pouch 601 (the bag body) adjacent to the opening. The outer ring member 620 has a coupling surface 620*e* (a mounting surface) having a shape obtained by extending the rim of a top surface 620*d* in the X-axis direction when viewed in the X-axis direction. The opening edge 601*a*1 provided on the inner peripheral surface of the pouch 601 is coupled with the coupling surface 620*e* provided on the outer peripheral surface of the outer ring member 620 by using a hot melt adhesive, welding, or the like. Thus, the pouch 601 and the nozzle unit 610 are integrated with each other.

The coupling surface 620*e* is the coupling portion (the connecting portion) of the discharge member configured to prevent toner leakage by being coupled with the pouch 601 (the bag body) all around the top surface 620*d* serving as the facing surface. As described above, after the pouch 601 is coupled with the outer ring member 620 and is filled with toner through the opening of the outer ring member 620, the nozzle 602 and the like may be attached to the outer ring member 620.

Detailed Shape of Pouch

Figure 19:
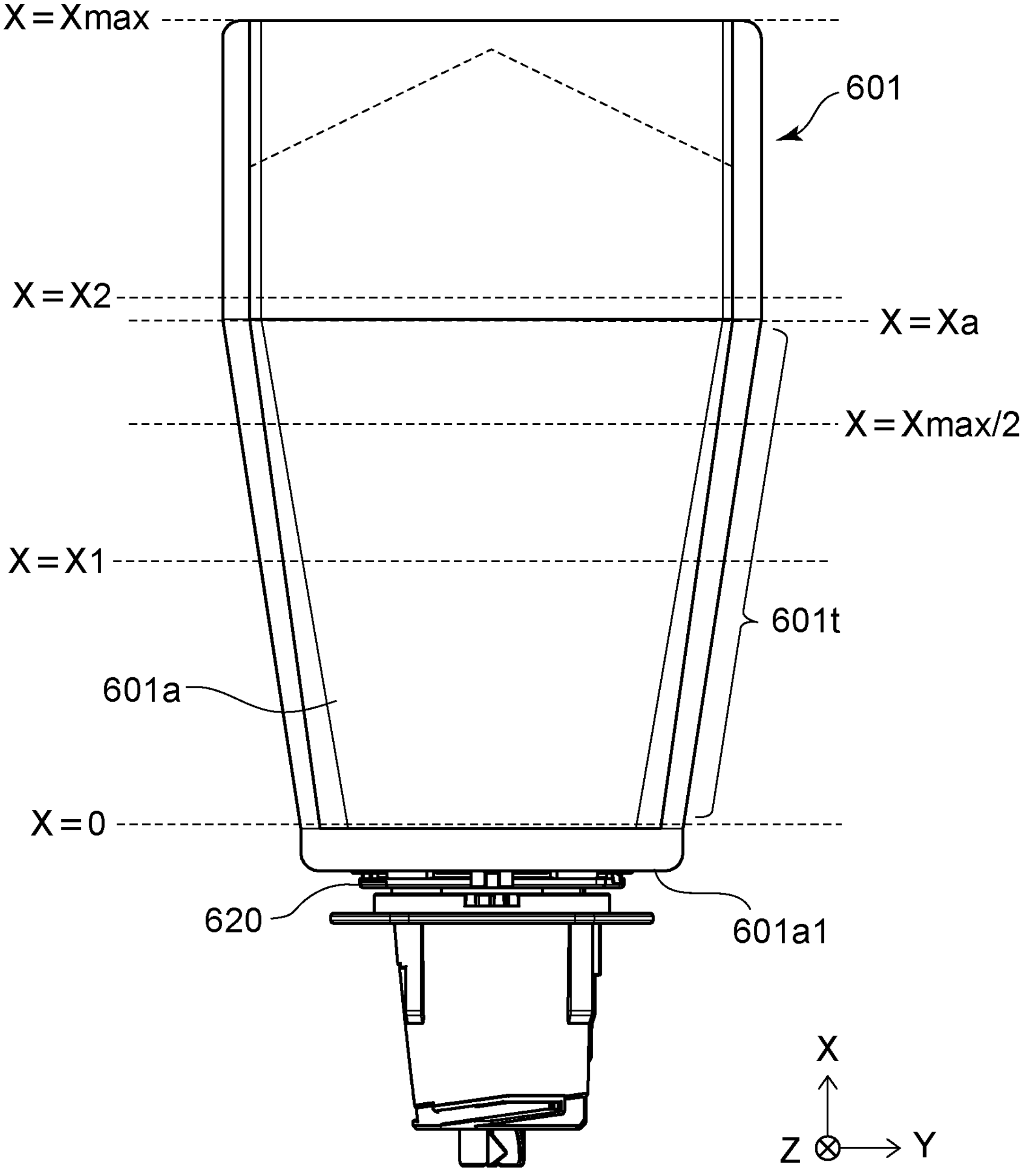
FIG. 19 illustrates the shape of the toner pack according to the first embodiment.

The external shape and the cross-sectional shape of the pouch 601 of the toner pack 600 according to the present embodiment are described in detail below with reference to FIGS. 19 to 23B. FIG. 19 illustrates the cut positions of the toner pack 600 illustrated in FIGS. 20A to 22B.

1. Overview

Hereinafter, positions in the X-axis direction are defined with reference to the position of the top surface 620*d* (the facing surface of the discharge member) of the nozzle unit 610 in the X-axis direction (X=0). The position of an end of the pouch 601 remote from the nozzle unit 610 in the X-axis direction is defined as X=Xmax. That is, the range of the values X in terms of the pouch 601 is 0≤X≤Xmax, where Xmax is the height (outer size) of the pouch 601 from the top surface 620*d* (the facing surface) in the X-axis direction. If the top surface 620*d* is not a flat surface perpendicular to the X-axis direction, a position in the X-axis direction can be defined with reference to a portion of the top surface 620*d* that is closest to the bottom portion 601*b* of pouch 601 in the X-axis direction (X=0).

In FIG. 19, 0<X1<Xmax/2<X2<Xmax. That is, X=X1 is closer to the nozzle unit 610 than half the height (Xmax) of the pouch 601 in the X-axis direction. In contrast, X=X2 is farther from the nozzle unit 610 than half the height (Xmax) of the pouch 601 in the X-axis direction.

Figure 20A:
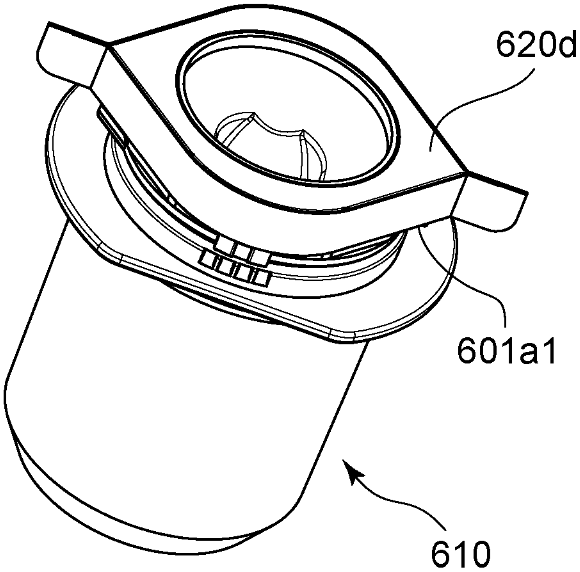
FIG. 20A is a perspective view of part of the toner pack cut at the position X=0.
Figure 20B:
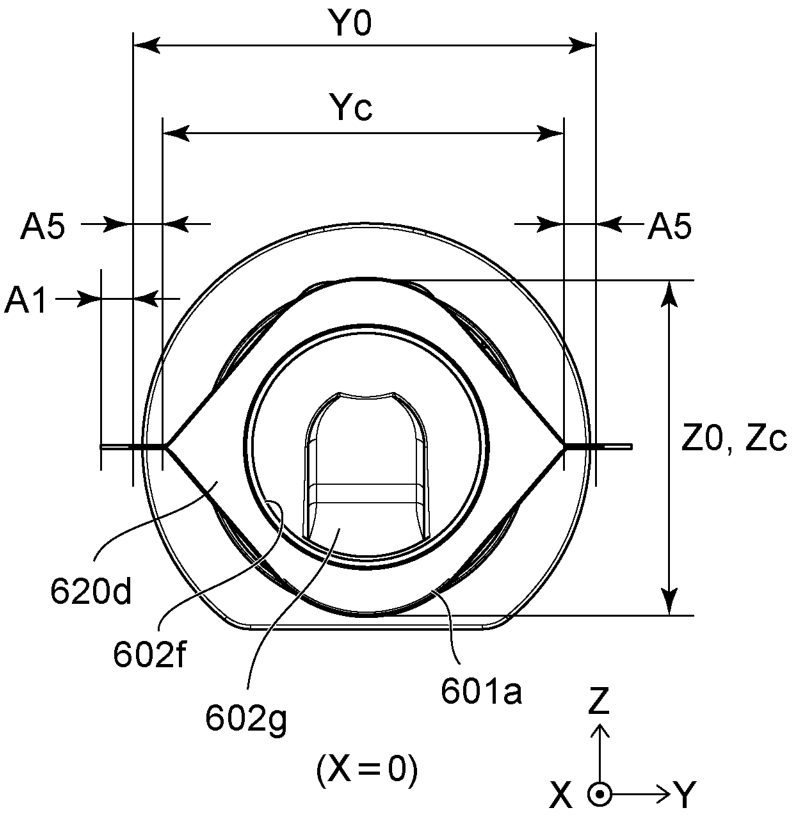
FIG. 20B is a cross-sectional view of the part of the toner pack.
Figure 21A:
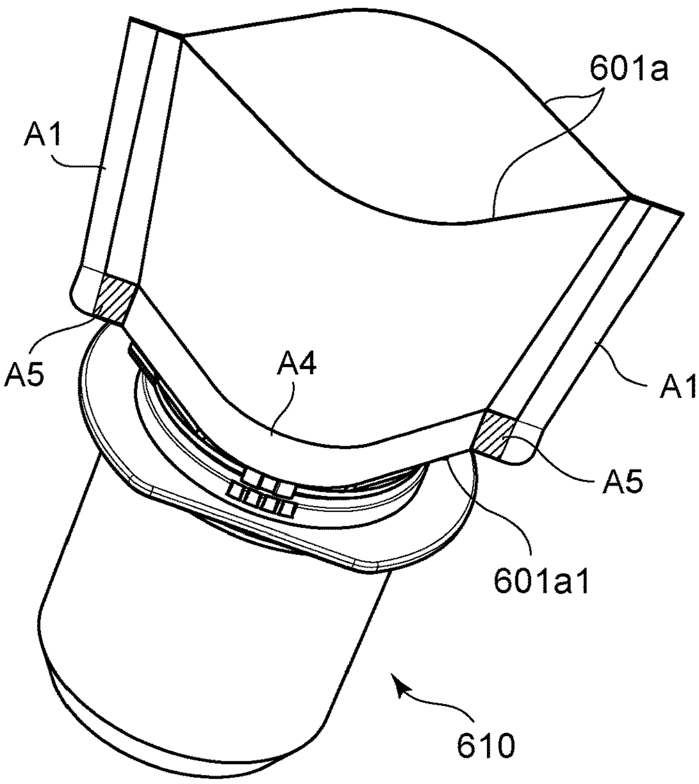
FIG. 21A is a perspective view of part of the toner pack cut at the position X=X1.
Figure 21B:
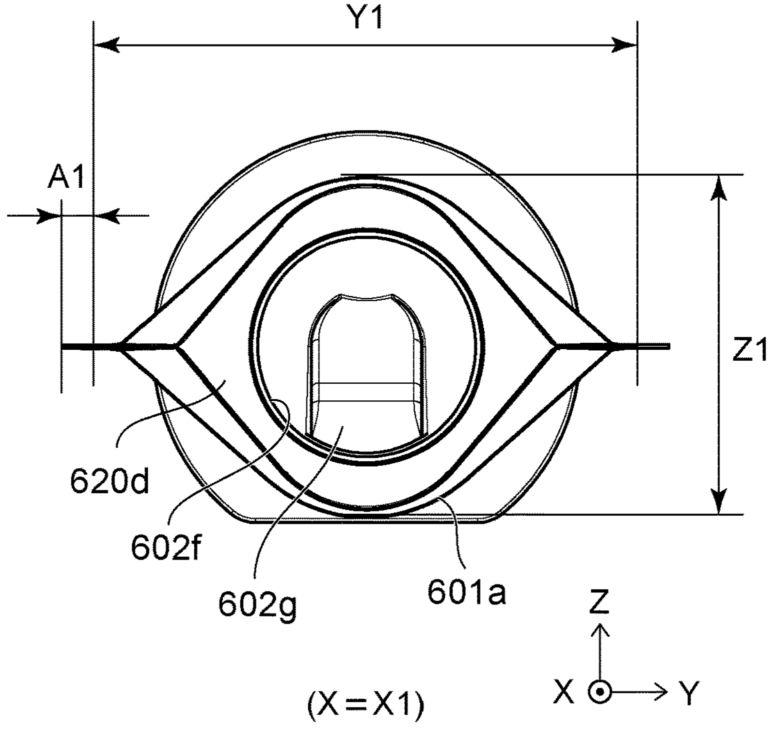
FIG. 21B is a cross-sectional view of the part of the toner pack.
Figure 22A:
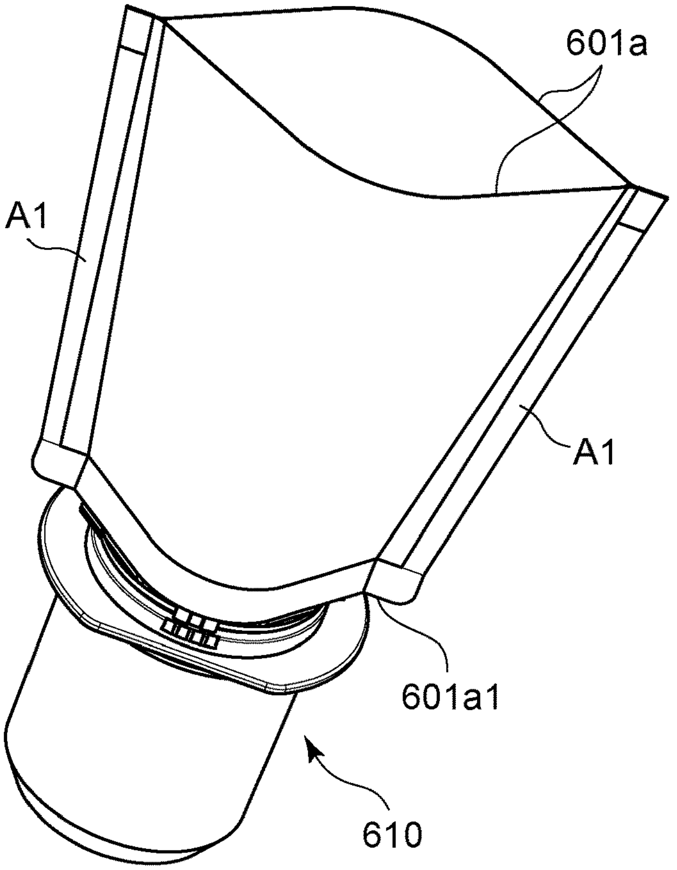
FIG. 22A is a perspective view of part of the toner pack cut at the position X=X2.
Figure 22B:
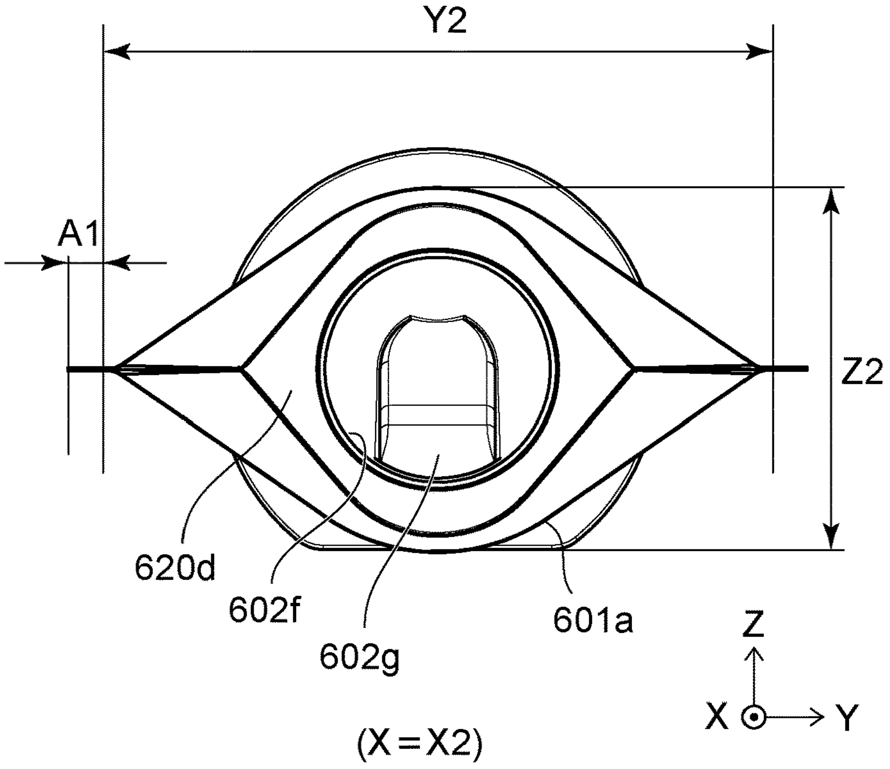
FIG. 22B is a cross-sectional view of the part of the toner pack.

FIG. 20A is a perspective view of a portion of the toner pack cut at the X=0 position illustrated in FIG. 19, and FIG. 20B is a cross-sectional view of the portion. FIG. 21A is a perspective view of a portion of the toner pack cut at the X=X1 position illustrated in FIG. 19, and FIG. 21B is a cross-sectional view of the portion. FIG. 22A is a perspective view of a portion of the toner pack cut at the X=X2 position illustrated in FIG. 19, and FIG. 22B is a cross-sectional view of the portion.

Figure 23A:
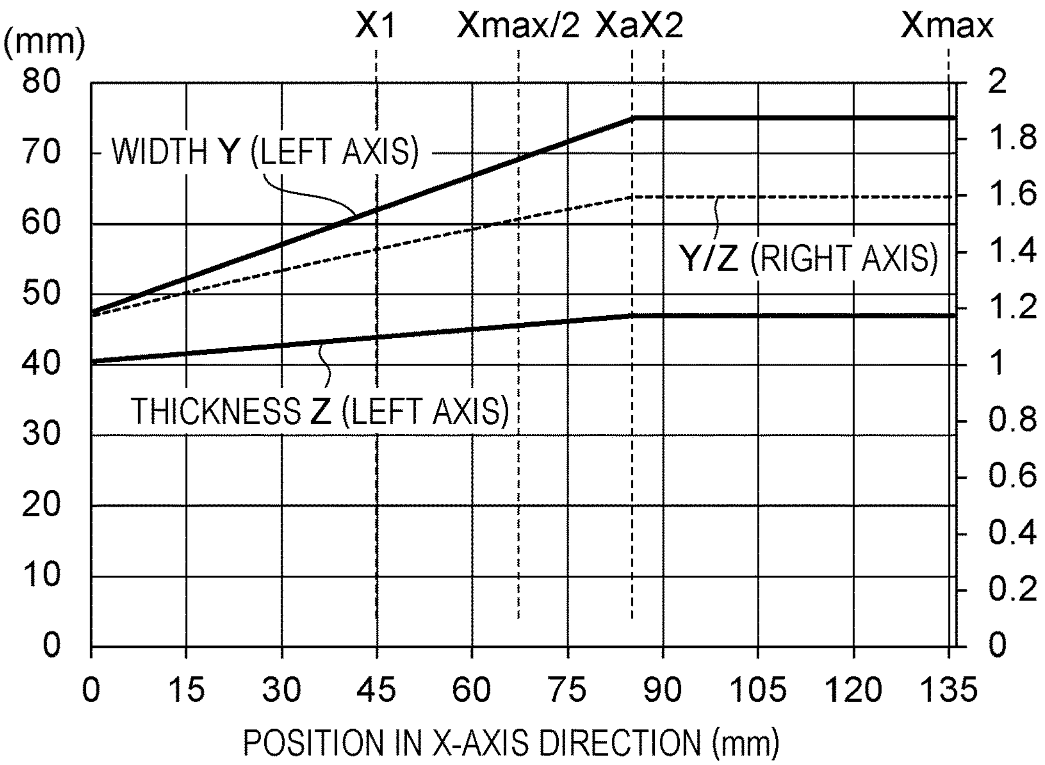
FIGS. 23A and 23B are graphs illustrating the parameters related to the shape of the toner pack.
Figure 23B:
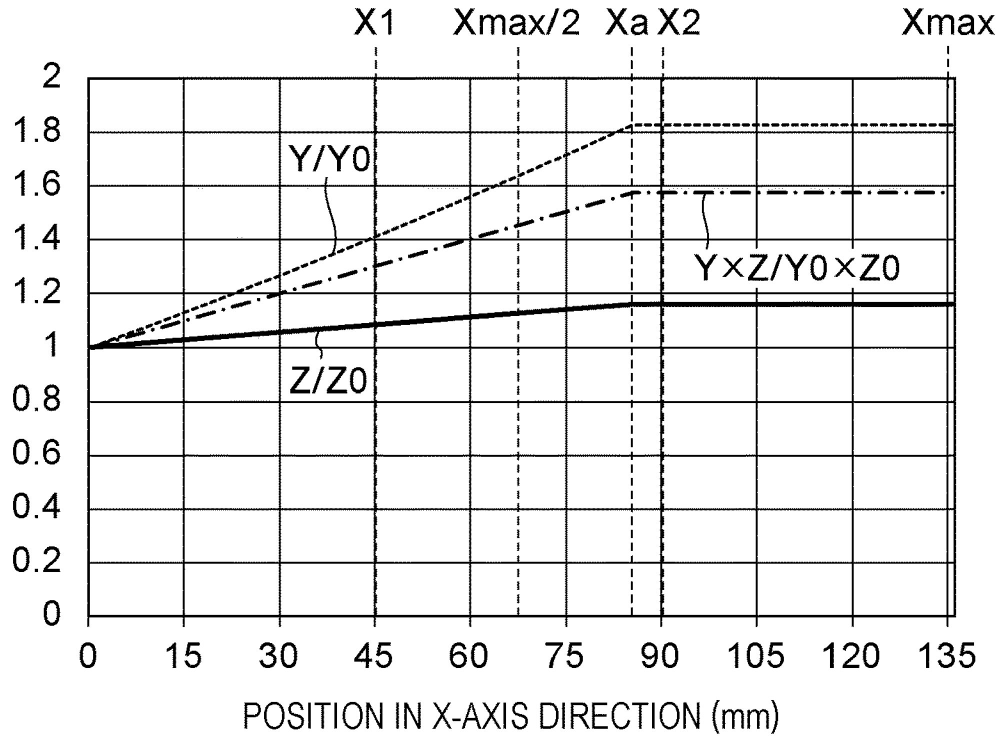

In FIGS. 23A and 23B, the parameters related to the shape of the pouch 601 according to the configuration example of the present embodiment are plotted in accordance with the positions in the X-axis direction.

Hereinafter, the size in the X-axis direction of the pouch 601 is referred to as a "height". When a position X in the X-axis direction is given, the size in the Y-axis direction of the pouch 601 in a plane perpendicular to the X-axis direction at the position X is referred to as "width Y" or simply "width." In addition, when a position X in the X-axis direction is given, the size of the pouch 601 in the Z-axis direction in a plane perpendicular to the X-axis direction at the position X is referred to as a "thickness Z" or simply "thickness". Note that the width Y and the thickness Z of the pouch 601 represent the inner sizes of the pouch 601 unless otherwise specified. The thickness Z represents the depth of the toner pack 600 or the pouch 601 in FIG. 17C when FIG. 17C is a front view of the toner pack 600.

In the configuration example according to the present embodiment, the width of the welded region at the side edge of the side portion 601*a* of the pouch 601 is about 5 mm throughout the length in the X-axis direction. Consequently, the outer size of the pouch 601 in the Y-axis direction is the sum of the width Y (the inner size) and 10 mm. Since the thickness of the film member that forms the pouch 601 is far less than the thickness Z of the pouch 601, the outer size of the pouch 601 in the Z-axis direction is substantially the same as the thickness Z (the inner size).

Since the pouch 601 is made from a flexible film member, the shape of the pouch 601 is described with reference to the natural shape of the pouch 601. The natural shape of the pouch 601 is the shape of the pouch 601 when the shape is not deformed by an external force. If the pouch 601 can have several shapes when no external force is applied, the natural shape of the pouch 601 can be observed in the following way. Deformation (bending) of the side portion 601*a* and the bottom portion 601*b* are first removed by grasping the nozzle unit 610 with the nozzle unit 610 upward and blowing air into the pouch 601 through the discharge port 602*a* to make the internal pressure of the pouch 601 slightly higher than one atmosphere. Then, the air blowing is stopped. After the internal pressure of pouch 601 returns to one atmosphere, the shape of the pouch 601 can be measured.

2. Overall Shape of Pouch

As illustrated in FIGS. 17A to 17F, the pouch 601 of the toner pack 600 according to the present embodiment has an external shape that extends long in the X-axis direction, and the maximum length Ymax of the pouch 601 in the Y-axis direction as viewed in the X-axis direction is greater than the maximum length Zmax of the pouch 601 in the Z-axis direction. That is, Xmax>Ymax>Zmax.

In the range 0≤X≤Xmax (That is, in the range of the possible value X for the pouch 601), the thickness Z of the pouch 601 in the cross-section perpendicular to the X-axis direction is less than or equal to the width Y.

That is, the following relationship holds in the range 0≤X≤Xmax:

$$X_{max} > Y \geq Z.$$

Thus, the pouch 601 according to the present embodiment has a shape that is vertically long in the X-axis direction and is flat in the Y-axis direction.

As illustrated in FIGS. 19 to 22B, in the range 0≤X≤Xa, the width Y and the thickness Z of the pouch 601 increase toward the bottom portion 601*b* of the pouch 601 in the X-axis direction. Note that Xa represents the inflection point of the shape of the pouch 601, and Xmax/2<Xa<Xmax. That is, the portion of the pouch 601 (the bag body) in the range 0≤X≤Xa is a tapered portion 601*t* formed so that the cross-sectional area of the pouch in the cross-section perpendicular to the X-axis direction decreases toward the top surface 620*d* of the nozzle unit 610 in the X-axis direction (the first direction).

Therefore, as illustrated in FIGS. 20A to 22B, let Y0, Y1, and Y2 denote the widths Y of the pouch 601 at X=0, X=X1, and X=X2, respectively. Then, Y0<Y1<Y2. In addition, let Z0, Z1, and Z2 denote the thicknesses Z of the pouch 601 at X=0, X=X1, and X=X2, respectively. Then, Z0<Z1<Z2.

The tapered portion 601*t* has a tapered shape where the width Y and thickness Z of the pouch 601 decrease toward the top surface 620*d* of the nozzle unit 610. This configuration can decrease the width Y0 and thickness Z0 of a lower end portion of the pouch 601 (X=0) while maintaining the capacity of the pouch 601, thus reducing the amount of toner that remains in the lower end portion of the pouch 601 when toner is discharged.

The same effect can be obtained if the shape of the pouch 601 is such that at least one of the width Y and thickness Z increases monotonically with respect to X in at least part of the range in the X-axis direction including the lower end portion (X=0) of the pouch 601. Alternatively, the same effect can be obtained if the shape of the pouch 601 is such that the cross-sectional area of the pouch 601 increases monotonically with respect to X in at least a part of the range in the X-axis direction including the lower end portion of the pouch 601 (X=0).

According to the present embodiment, in the range Xa≤X≤Xmax, the width Y and thickness Z of the pouch 601 are constant (Y=Ymax, and Z=Zmax).

In the configuration example according to the present embodiment, Xmax=135 mm, Ymax=75 mm, and Zmax=47 mm. In the configuration example, the volume of the storage space in the pouch 601 is about 200 $cm^3$, and the amount of refill toner is 75 g.

In the configuration example, the width Y0 and thickness Z0 of the pouch 601 at X=0 are Y0=47.6 mm and Z0=40.5 mm, respectively. The inflection point (Xa) is about 85 mm from the top surface 620*d*. In a tapered portion 601*t*, the width Y and thickness Z vary from Y0 and Z0 to Ymax and Zmax, respectively, at a substantially constant rate with respect to X.

3. Thickness of Pouch

In the reference example of toner pack 40 illustrated in FIGS. 1A and 1B, the pouch has a tapered shape so that the thickness of the pouch in the Z-axis direction decreases toward the bottom portion of the pouch (the opposite side of the nozzle) in the X-axis direction. However, in the configuration, the ratio of the volume of the pouch, which is the space that can actually store toner, to the space occupied by the pouch (a cuboid with a height of Xmax, a width of Ymax, and a thickness of Zmax) is low. Consequently, to fill the toner pack 40 with a sufficient amount of toner, the pouch needs to be increased.

According to the present embodiment, the pouch 601 has a shape in which the pouch 601 has substantially the same thickness Z throughout the length of the pouch 601 in the X-axis direction. More specifically, in the range 0≤X≤Xmax, the thickness Z of the pouch 601 satisfies the following expression:

$$0.8 \times Z0 \leq Z \leq 1.2 \times Z0,$$

where Z0 is the thickness of the pouch 601 at X=0 (FIGS. 20A and 20B).

As denoted by a solid line in FIG. 23B, the value Z/Z0 in the configuration example falls within the range of 1.0 to 1.2 for 0≤X≤Xmax (=135). As a result, the above expression is satisfied.

As described above, the thickness Z of the pouch 601 is greater than or equal to 80% of the thickness Z0 at X=0 throughout the length in X-axis direction (0≤X≤Xmax). Therefore, the ratio of the volume of the pouch 601 to the space occupied by the pouch 601 can be increased, and a sufficient amount of toner can be supplied using a compact pouch 601. In addition, the thickness Z of the pouch 601 is less than or equal to 120% of the thickness Z0 at X=0 throughout the length in X-axis direction (0≤X≤Xmax). Therefore, the adverse effects of an excessively large thickness Z of the pouch 601 (for example, difficulty in alignment during packaging and reduction in stability when placed horizontally) can be reduced.

According to the present embodiment, the bottom portion 601*b* of the pouch 601 and the top surface 620*d* (the facing surface) of the nozzle unit 610 that face each other in the X-axis direction are both spindle-shaped with the major axis direction in the Y-axis direction. The ratio of a length Zc in the Z-axis direction of the top surface 620*d* (the length in the minor axis direction of the spindle shape, FIG. 20B) to a thickness Zd of the bottom portion 601*b* of the pouch 601 (the length in the minor axis direction of the spindle shape, FIG. 17A) is set to a value close to 1. More specifically, 0.8×Zc≤Zd≤1.2×Zc. As a result, the cross-sectional shape of the pouch 601 is spindle-shaped throughout the length in X-axis direction, and the thickness Z of the pouch 601 is maintained at a value close to Zc. Therefore, the pouch shape that can be easily manufactured enables a compact pouch 601 to be filled with a sufficient amount of toner. In addition, a configuration that can avoid the adverse effects of an excessively large thickness Z of the pouch 601.

4. Relationship 1 Between Width Y and Thickness Z of Lower Half of Pouch

In addition to the configuration described in Sections 2 and 3 above, the pouch 601 according to the present embodiment is configured so that $Y \leq 2 \times Z$ in the range $0 \leq X < 0.5 \times Xmax$ ($Y/Z \leq 2$ in FIG. 23A).

That is, the pouch 601 is configured so that the width Y of the pouch 601 is not greater than twice the thickness Z in the lower half of the pouch 601 (the portion closer to the nozzle unit 610 than $X = \frac{1}{2} \times Xmax$). That is, the pouch 601 is designed such that in the lower half of the pouch 601, the cross-sectional shape of the pouch 601 in the plane perpendicular to the X-axis direction is not excessively flattened in the Y-axis direction.

The pouch 601 according to the present embodiment is made from a flexible film member and has an external shape that is vertically long in the X-axis direction (the first direction) and that is flattened in the Y-axis direction (the second direction) as described in Section 2 above. For this reason, it is required to ensure the bending strength against external forces in the Z-axis direction (the third direction). According to the configuration in which $Y \leq 2 \times Z$ in the range $0 \leq X < 0.5 \times Xmax$, the cross-sectional shape of the pouch 601 is not excessively flattened in the lower half of the pouch 601 (the thickness Z is not excessively decreased with respect to the width Y). This configuration can ensure the bending strength of the pouch 601 in the Z-axis direction. For example, inconveniences can be prevented, such as bending of the upper half of pouch 601 to one side in the Z-axis direction during toner refill or bending that easily occurs during handling, which may reduce workability during packaging.

As illustrated in FIG. 23A, it is more desirable to configure the pouch 601 so that $Y \leq 2 \times Z$ throughout the range of X ($0 \leq X < Xmax$). In addition, it is more desirable to configure the pouch 601 so that $Y \leq 1.75 \times Z$ in the range $0 \leq X < 0.5 \times Xmax$. This makes it easier to ensure the bending strength of the pouch 601 in the Z-axis direction.

5. Product of Width Y and Thickness Z of Lower Half of Pouch

In addition to the configuration described in Sections 2 and 3 above, the pouch 601 according to the present embodiment is configured so that $Y0 \times Z0 \leq Y \times Z \leq 2.5 \times Y0 \times Z0$ in the range $0 \leq X < 0.5 \times Xmax$ ($1 \leq Y \times Z / Y0 \times Z0 \leq 2.5$ in FIG. 23B). That is, in the lower half of the pouch 601, the lower and upper limits of the product $Y \times Z$ (the product of the vertical length and the horizontal length of the cross-section of the pouch 601) are set on the basis of the product $Y0 \times Z0$ (the product of the vertical length and the horizontal length of the cross section of the pouch 601) at the lower end portion of the pouch 601 ($X=0$).

As described in Section 3 above, the thickness Z of the pouch 601 is set to a value substantially the same as the thickness Z0 at X=0 throughout the length in X-axis direction. Therefore, according to the relationship $Y \times Z \leq 2.5 \times Y0 \times Z0$, the width Y is not excessively increased with respect to the thickness Z, which is substantially constant, in the lower half of the pouch 601.

The pouch 601 according to the present embodiment is made from a flexible film member and has an external shape that is vertically long in the X-axis direction (the first direction) and that is flattened in the Y-axis direction (the second direction), as described in Section 2 above. For this reason, it is required to ensure the bending strength against external forces in the Z-axis direction (the third direction). According to the configuration in which $Y \times Z \leq 2.5 \times Y0 \times Z0$ in the range $0 \leq X < 0.5 \times Xmax$, the cross-sectional shape of the pouch 601 is not excessively flattened in the lower half of the pouch 601 (the thickness Z is not excessively decreased with respect to width Y). This configuration can ensure the bending strength of the pouch 601 in the Z-axis direction. In addition, due to the configuration in which $Y0 \times Z0 \leq Y \times Z$ in the range $0 \leq X < 0.5 \times Xmax$, the cross-sectional area of the lower half of the pouch 601 is greater than or equal to the cross-sectional area of the pouch 601 at the lower end portion (X=0). Thus, a sufficient volume of the pouch 601 can be secured.

As illustrated in FIG. 23B, it is more desirable to configure the pouch 601 so that $Y0 \times Z0 \leq Y \times Z \leq 2 \times Y0 \times Z0$ throughout the range of X ($0 \leq X < Xmax$). This makes it easier to ensure the bending strength of the pouch 601 in the Z-axis direction.

6. Relationship 2 Between Width Y and Thickness Z of Lower Half of Pouch

In addition to the configuration described in Sections 2 and 3 above, the pouch 601 according to the present embodiment is configured so that $Z \leq 0.9Y$ in the range $0 \leq X < 0.5 \times Xmax$ ($Y/Z \geq 1.11 \ldots$ in FIG. 23A). That is, in the lower half of the pouch 601, the cross-sectional shape of the pouch 601 is horizontally long in the Y-axis direction so that the thickness Z is less than or equal to 90% of the width Y.

The pouch 601 according to the present embodiment is made from a flexible film member and is configured such that during toner refill, the user kneads the pouch 601 by hand with the nozzle unit 610 of the pouch 601 facing downward to discharge toner. In this case, since the cross-sectional shape of the lower half of the pouch 601 is horizontal long in the Y-axis direction, the user can easily discharge toner from the pouch 601 by pinching the pouch 601 from both sides in the Z-axis direction and pushing toner inside with their fingers.

7. Relationship Between Width Y of Lower End Portion of Pouch and Width Yc of Top Surface of Nozzle In addition to the configuration described in Sections 2 and 3 above, the pouch 601 according to the present embodiment is configured so that $1 \leq Y0/Yc \leq 1.5$, where Yc is the width in the Y-axis direction of the top surface 620*d* of the nozzle unit 610 (FIG. 20B).

According to the present embodiment, the pouch 601 having a flattened cross-sectional shape in the Y-axis direction (the second direction) is employed and, during toner refill, toner is discharged from the pouch 601 with the nozzle unit 610 facing downward. In the configuration, if the difference between the width Yc of the top surface 620*d* of the nozzle unit 610 (the facing surface of the discharge member) and the width Y0 of the lower end portion of the pouch 601 is large, toner is likely to remain in the lower end portion of the pouch 601 without being discharged. However, according to the present embodiment, the relationship $1 \leq Y0/Yc \leq 1.5$ is satisfied, which makes the toner less likely to remain in the lower end portion of the pouch 601 during toner discharge.

As illustrated in FIG. 21A, the opening edge 601*a*1 of the side portion 601*a* of the pouch 601 has a welding margin (A5) where parts of the opening edge 601*a*1 are welded to each other on the outer side of the outer ring member 620 (also refer to FIG. 18B and FIG. 20B). That is, the side portion 601*a* of the pouch 601 has an extension region A5 between a region A4 where the opening edge 601*a*1 is coupled with the coupling surface 620*e* of the outer ring member 620 and a region A1 where the side portions 601*a* are welded to each other at the side edge in the Y-axis direction and, in the extension region A5, the parts of the opening edge 601*a*1 are welded to each other. By setting the extension region A5, even if the circumferential length of the opening edge 601*a*1 varies slightly due to a tolerance during pouch making of the pouch 601, the circumference length is not less than the circumferential length of the coupling surface 620*e* and, thus, the opening edge 601*a*1 can be easily fitted onto the outside of the coupling surface 620*e*. As a result, the workability of integrating the pouch 601 (the bag body) with the nozzle unit 610 (the discharge member) is improved.

The region A4 is a first portion where the film member that forms the side portion 601*a* of the pouch 601 (the bag body) is coupled to the spindle-shaped outer ring member 620. The extension region A5 is a second portion where the film members are welded to each other from each of the major-axis ends of the outer ring member 620 outwardly in the second direction (the Y-axis direction). The region A1 is a region extending from an end of the second portion in the second direction (the Y-axis direction) toward the bottom portion 601*b* of the pouch 601 in the first direction (the X-axis direction) and serves as a third portion in which the side edges of the film members in the second direction (the Y-axis direction) are welded to each other. Therefore, the width Y0 of the pouch 601 at the lower end portion of the pouch 601 (X=0) is the sum of the width Yc of the top surface 620*d* of the nozzle unit 610 (the facing surface of the discharge member) and the length of the extension regions A5 (two second portions) on either side in the Y-axis direction.

If, in the configuration, the extension region A5 is disposed so that $1 \le Y0/Yc \le 1.5$, a configuration is achieved that increases the workability during manufacture and that prevents toner from remaining in the lower end portion of the pouch 601 during toner discharge.

To reduce toner remaining in the pouch 601 more when toner is discharged, the relationship $1 \le Y0/Yc \le 1.3$ is more desirable.

While the present embodiment has been described with reference to the length Zc (FIG. 20B) of the top surface 620*d* of the nozzle unit 610 in the Z-axis direction that is the same as the thickness Z0 of the lower end portion of the pouch 601, the relationship $1 \le Z0/Zc \le 1.5$ is desirable if Z0 and Zc differ from each other, and the relationship $1 \le Z0/Zc \le 1.3$ is more desirable.

8. Range of Width Y and Lower Limit of Thickness Z

In addition to the configuration described in Sections 2 and 3 above, the pouch 601 according to the present embodiment is configured so that $Y0 \le Y \le 2.5 \times Y0$ and $Z \ge 30$ mm in the range $0 \le X \le Xmax$ ($1 \le Y/Y0 \le 2.5$ in FIG. 23B and $Z \ge 30$ in FIG. 23A). That is, throughout the length in the X-axis direction, the width Y of the pouch 601 is in the range of 100% to 250% of the width Y0 at the lower end portion of the pouch 601, and the lower limit of the thickness Z of the pouch 601 is 30 mm.

The lower and upper limits of the width Y of the pouch 601 and the lower limit of the thickness Z can ensure the bending strength of the pouch 601 in the Z-axis direction while securing the capacity of the pouch 601.

At least one of the configurations described in Sections 4 to 8 above can provide a new form of toner container.

9. Two-Dimensional Code

Two-dimensional code 6011 provided on the toner pack 600 is described below. According to the present embodiment, the two-dimensional code 6011 is provided on the toner pack 600. The two-dimensional code is code to be displayed and has information in both horizontal and vertical directions. The two-dimensional code 6011 in the present example is two-dimensional barcode, such as a QR code (registered trademark). By scanning the two-dimensional code 6011, the user can acquire information related to at least the toner pack 600, such as information regarding the operation for toner refill from the toner pack 600 and information regarding the toner pack. For this reason, it is required that the two-dimensional code 6011 be provided at a location that is easy for the user to find and scan.

Figure 24:
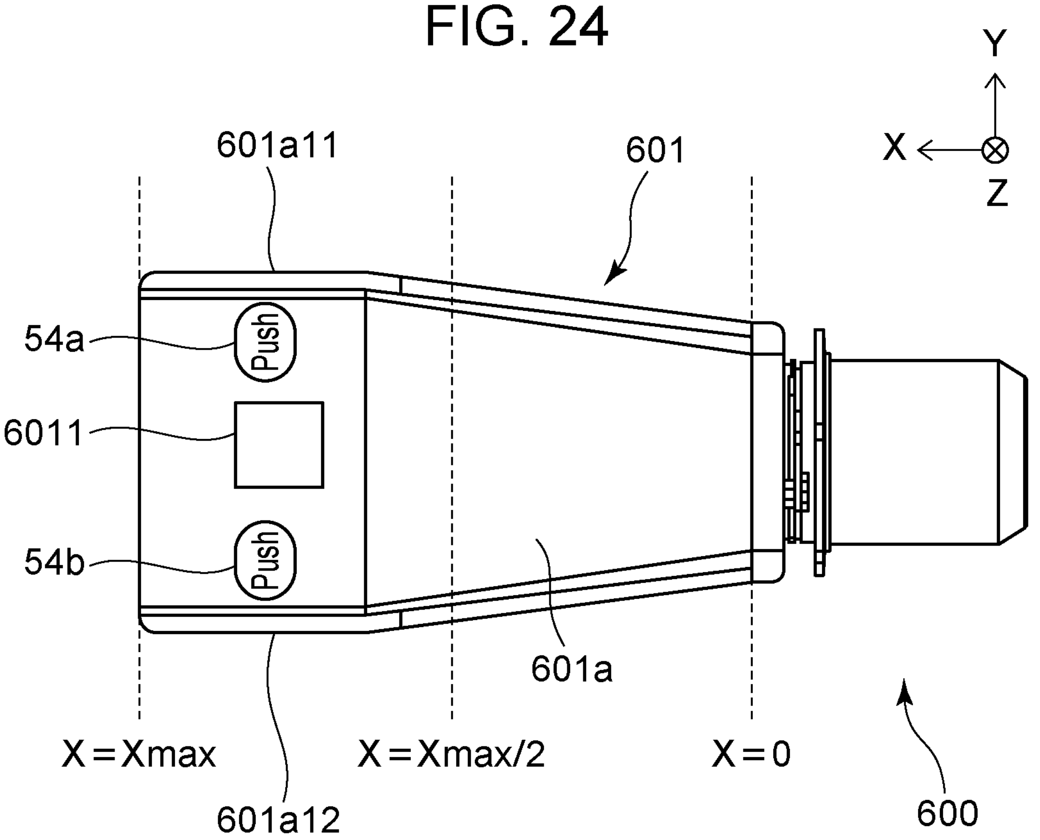
FIG. 24 is a front view of the toner pack according to the first embodiment.

FIG. 24 is a schematic illustration of the toner pack 600 as viewed from the front. As illustrated in FIG. 24, the outer surface of the side portion 601*a* of the toner pack 600 has, there on, the two-dimensional code 6011 and marks 54*a* and 54*b* serving as instructions. The two-dimensional code 6011 is disposed at a location closer to the end portion adjacent to the bottom portion (X=Xmax) than to the lower end portion adjacent to the opening of the pouch 601 (X=0) in the X-axis direction of the pouch 601. In addition, the two-dimensional code 6011 is disposed at a substantially central position between two end edges 601*a*11 and 601*a*12 in the Y-axis direction.

Similarly, the marks 54*a* and 54*b* are disposed closer to the end portion (X=Xmax) opposite the lower end portion of the pouch 601 (X=0) than to the lower end portion in the X-axis direction of the pouch 601. In addition, the marks 54*a* and 54*b* are disposed equally spaced from a center position between two end edges 601*a*11 and 601*a*12 in the Y-axis direction. That is, the marks 54*a* and 54*b* are disposed at positions that are line symmetrical with respect to the normal passing through the midpoint between the two end edges 601*a*11 and 601*a*12. In the present example, the two-dimensional code 6011 and the marks 54*a* and 54*b* are provided on the outer surface of the same side portion 601*a* in this way.

As described above, the toner pack 600 is configured such that the flow path 602*g* (a discharge channel) receives toner inside the pouch 601 through the receiving port 602*f* when the toner pack 600 is mounted on the mounting unit 500 of the printer body 100 and then the pack-side shutter and the apparatus-side shutter are open. At this time, the user can knead the pouch 601 by hand to facilitate the discharge of toner from the inside of the pouch 601. That is, the hand kneading action enables more amount of toner to be supplied to the printer body 100 efficiently. The marks 54*a* and 54*b* serving as instructions are provided to inform the user of the above-described toner discharge promotion action in a mounting operation just before toner refill. When the toner pack 600 is mounted on the mounting unit 500, the user can easily see the marks 54*a* and 54*b* since the marks 54*a* and 54*b* are provided closer to the end portion (X=Xmax) opposite the lower end portion of the pouch 601 (X=0) than to the lower end portion. This is because the marks 54*a* and 54*b* are located at a position higher than the mounting unit 500 in the direction of gravity, that is, a position closer to the user's line of sight.

Like the marks 54*a* and 54*b*, the two-dimensional code 6011 is located closer to the end portion (X=Xmax) opposite the lower end portion of the pouch 601 (X=0) than to the lower end portion in the X-axis direction of the pouch 601 and, thus, is highly visible. That is, since the two-dimensional code 6011 is provided at a position close to the end portion (X=Xmax) opposite the lower end portion of the pouch 601 (X=0) than to the lower end portion in the X-axis direction of the pouch 601, the user can easily see the two-dimensional code 6011 when the toner pack 600 is mounted on the mounting unit 500. Furthermore, according to the configuration of this example, the two-dimensional code 6011 is located so as to overlap at least partially with the marks 54*a* and 54*b* in the Y-axis direction, which is perpendicular to the X-axis direction. For this reason, the user can more easily see the two-dimensional code 6011 after seeing the marks 54*a* and 54*b*.

According to the configuration of this example, the rigidity of the lower end portion of the pouch 601 having the nozzle unit 610 and the outer ring member 620 provided thereon is higher than that of the pouch 601 that is flexible. Therefore, by grasping the nozzle unit 610 or the lower end portion of the pouch 601 just before mounting the toner pack 600 on the printer body 100, the user can grasp the toner pack 600 more stably than the user grasping only the flexible pouch 601. At this time, the user grasps the lower end portion of the pouch 601 (X=0) or the vicinity of the lower end portion of the pouch 601 (X=0). Therefore, by providing the two-dimensional code 6011 and the marks 54*a* and 54*b* closer to the end portion (X=Xmax) opposite the lower end portion of the pouch 601 (X=0) than to the lower end portion, the visibility of the two-dimensional code 6011 and the marks 54*a* and 54*b* can be increased. That is, even when the user grasps the toner pack 600, the two-dimensional code 6011 and the marks 54*a* and 54*b* are visible without being hidden by the user's grasping hand.

Figure 25:
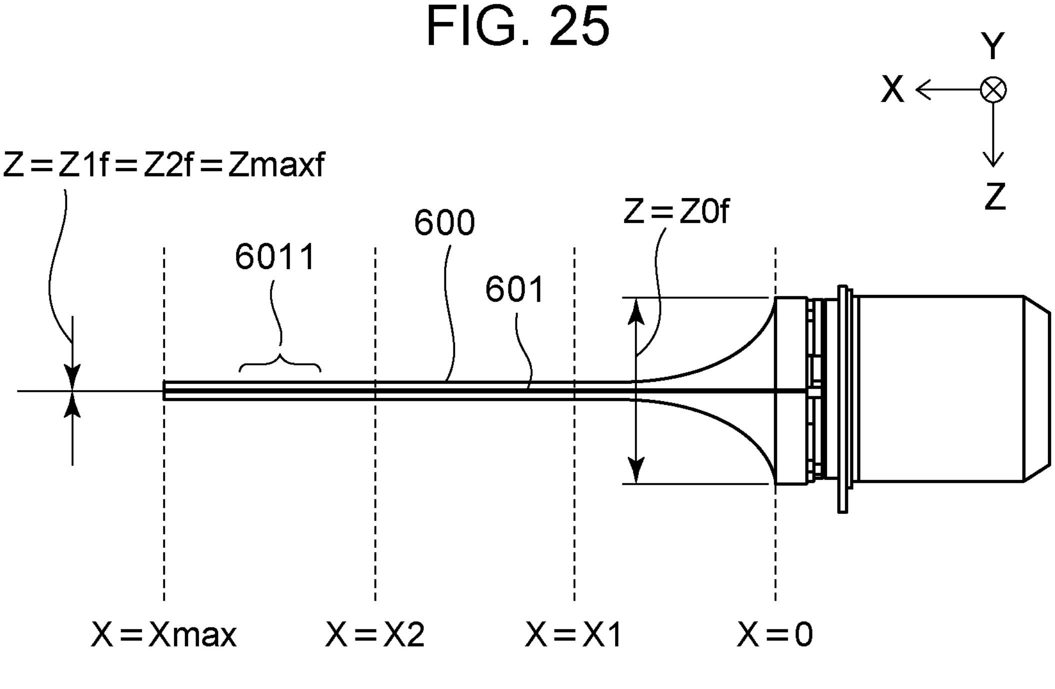
FIG. 25 is a side view of the toner pack after toner refill according to the first embodiment.

FIG. 25 is a side view of the toner pack 600 after toner refill. As illustrated in FIG. 25, after toner refill, there is no toner in the space in the toner pack 600 that can store toner, and the toner pack 600 has a shape illustrated in FIG. 25. More precisely, let Z0*f*, Z1*f*, Z2*f*, and Zmaxf denote the thicknesses Z of the pouch 601 at X=0, X=X1, X=X2, and X=Xmax, respectively, after refill. Then, Z0*f*>Z1*f*=Z2*f*=Zmaxf. Furthermore, since there is little toner left in the toner pack 600, the thicknesses Z2*f*, Z1*f*, and Zmaxf are substantially 0 mm.

The thickness Z0*f* is almost the same as the length Zc in the Z-axis direction of the top surface 620*d* of the outer ring member 620. For this reason, the thickness Z of the pouch 601 changes rapidly from Z0*f*=Zc to Z1*f*=0 between X=0 and X=X1. Between X=X1 and X=X2 and between X=X2 and X=Xmax, Z1*f*, Z2*f* and Zmaxf are almost the same, and the thickness change is small. That is, when viewed in the Y-axis direction, the pouch 601 after refill has a curved region (shape) from X=0 to X=X1 of the side portion 601*a* and a flat region (shape) from X=X1 to X=Xmax. At the position where the outer ring member 620 is provided (X=0), the thickness of the pouch 601 before and after refill hardly changes because of the presence of the outer ring member 620. When comparing the shapes of the pouch 601 before and after refill, the amount of change in thickness at the position where the two-dimensional code 6011 is provided is greater than that at the position where the outer ring member 620 is provided.

In the present example, the two-dimensional code 6011 is provided in the flat region. The marks 54*a* and 54*b* are also provided on the flat region as instructions to assist the user to operate the toner pack 600. As described above, the two-dimensional code 6011 is required to be easy to scan. Since the scannability increases if the two-dimensional code 6011 is disposed on a flat surface, it is desirable that the two-dimensional code 6011 be disposed on a flatter surface. For this reason, since the two-dimensional code 6011 is disposed closer to the end portion (X=Xmax) opposite the lower end portion of the pouch 601 (X=0) than to the lower end portion, the scannability by the user can be maintained even after refill.

Furthermore, in the present example, the outer ring member 620 is shaped to increase the opening of the pouch 601, and the side portion 601*a* has a predetermined curvature at the position where the outer ring member 620 corresponding to the position X=0 in FIG. 24 is provided. The curvature of the side portion 601*a* corresponding to the position where the two-dimensional code 6011 is provided is less than the predetermined curvature of the side portion 601*a* corresponding to the position X=0. This is because the visibility and scannability of the two-dimensional code 6011 can be improved when the two-dimensional code 6011 is provided in a flatter region.

After refill, the pouch 601 has a shape in which the curvature of the side portion 601*a* decreases from the position X=0 adjacent to the opening toward the position X=Xmax adjacent to the bottom portion in the X direction (the first direction from the opening to the bottom portion). The two-dimensional code 6011 is provided on the surface of the side portion 601*a*, which is a region of a smaller curvature even after refill. That is, the visibility and scannability can be ensured even after refill.

Second Embodiment

The second embodiment of the present disclosure is described below. According to the second embodiment, a configuration in which two-dimensional code 7011 is disposed on the bottom portion of the toner pack is employed. For this reason, configurations similar to those described in the first embodiment are not illustrated or are identified by the same reference numerals.

Figure 26:
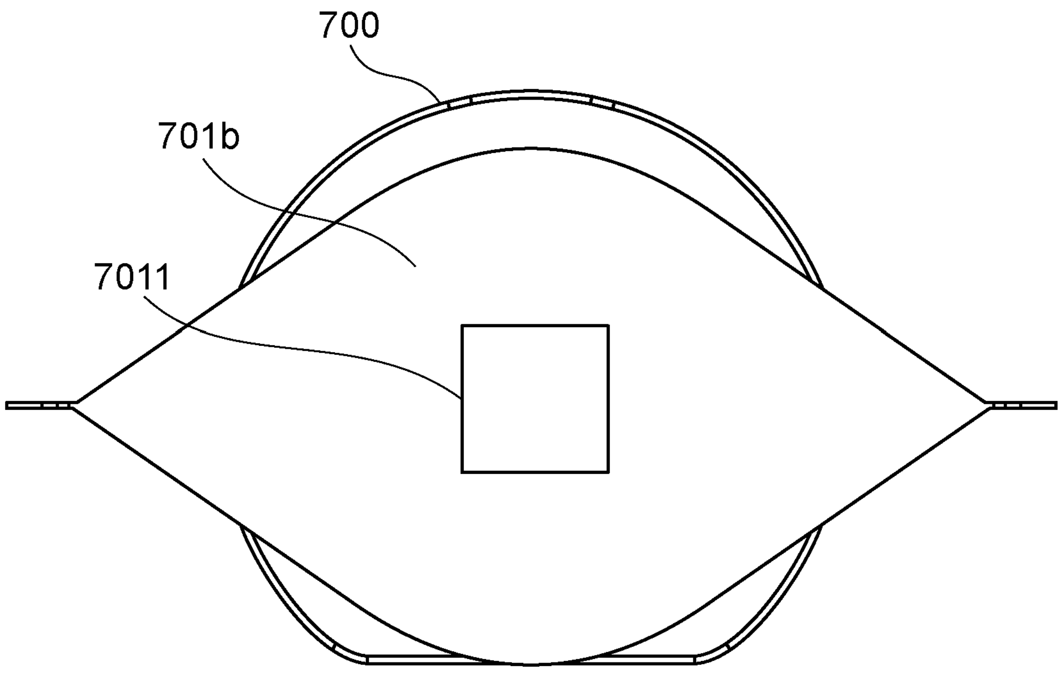
FIG. 26 is a plan view of the toner pack according to a second embodiment.

FIG. 26 is a plan view of a toner pack 700. As illustrated in FIG. 26, two-dimensional code 7011 is provided on a bottom portion 701*b* of the toner pack 700. When the toner pack 700 is mounted on the printer body 100, the bottom portion 701*b* is a surface that is easily visible to the user. Therefore, the two-dimensional code 7011 is disposed on the bottom portion 701*b*, making the two-dimensional code 7011 easily seen by the user and preventing the user from losing the opportunity to scan the two-dimensional code 7011.

Other Embodiments

According to the embodiments and modifications above, the configuration has been described in which the pack-side shutter 603 and the apparatus-side shutter 509 are opened by operating the lever 508 adjacent to the apparatus body after the toner pack 600 is mounted on the mounting unit 500 of the printer body 100. However, a technique of connecting the toner container to the filler opening of the image forming apparatus is not limited thereto. For example, after the toner pack 600 is mounted on the mounting unit 500, the user may grasp the pouch 601 and rotate the pouch 601 relative to the printer body 100 to communicate the discharge port 602*a* of the nozzle 602 with the filler opening 32*a* of the printer body 100. Alternatively, for example, a configuration that allows the user to remove a cap or a seal of the toner container to expose the discharge port of the toner container may be employed. Furthermore, the aspects of the present disclosure according to the above-described embodiments may be combined in any way.

The two-dimensional code 6011 may be formed by printing on the surface of a flexible film member (sheet member) that constitutes the side portion 601*a* of the pouch 601, or the two-dimensional code 6011 may be formed on an adhesive seal or the like and, thereafter, may be affixed to the side portion 601*a*. The two-dimensional code 6011 may be formed after the pouch 601 is configured with a plurality of film members or may be formed on a plurality of film members before the pouch 601 is configured.

The marks 54*a* and 54*b* serving as instructions can be formed by the same method as described for the two-dimensional code 6011. According to the embodiments and modifications described above, the instructions are provided on the side portion 601*a*. The instructions may be provided on the entire surface of the side portion 601*a* or only on one side of the pouch 601 divided in the X-axis or Y-axis direction. Thus, the instructions can be provided at any appropriate location. To maintain the visibility, it is desirable that the instructions be provided on a flatter region, as described in the present embodiments and modifications.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-174112 filed Oct. 31, 2022, which is hereby incorporated by reference herein in its entirety.

What is claimed is:

1. A toner container comprising:

a flexible bag body configured to store toner, the bag body including a side portion formed into a bottomed cylindrical shape which includes an opening, the side portion extending in a first direction from the opening to a bottom portion opposite the opening;

a coupling member coupled with the opening; and a nozzle connected to the coupling member and configured to discharge the toner stored in the bag body, wherein a two-dimensional code is provided on an outer surface opposite an inner surface of the side portion that forms the bottomed cylindrical shape storing toner, the two-dimensional code being located closer to the bottom portion than to the opening in the first direction, wherein, as compared with shapes of the bag body before and after toner is discharged through the nozzle from the bottomed cylindrical shape, an amount of change in a first thickness of the bag body corresponding to a position of the two-dimensional code is greater than an amount of change in a second thickness of the bag body at a position of the coupling member in a thickness direction of the bag body perpendicular to the first direction.

2. The toner container according to claim 1, wherein the bag body is formed by stacking and welding a plurality of sheet members, and the bag body has a shape that is deformable by an external force.

3. The toner container according to claim 1, wherein the coupling member has a shape that expands the opening of the bag body, and wherein a curvature of the outer surface of the side portion corresponding to a position of the two-dimensional code is less than a curvature of the outer surface of the side portion corresponding to a position of the coupling member.

4. The toner container according to claim 3, wherein the curvature of the outer surface of the side portion of the bag body decreases from the opening toward the bottom portion in the first direction.

5. The toner container according to claim 1, wherein the two-dimensional code is provided in a region where the outer surface of the side portion is flattened in the thickness direction after the toner is discharged from the bag body.

6. The toner container according to claim 1, wherein an instruction to assist an operation performed by a user is provided on the bag body.

7. The toner container according to claim 6, wherein the instruction is provided on a surface that is the same as the outer surface of the side portion on which the two-dimensional code is provided.

8. The toner container according to claim 1, wherein an outer periphery of the coupling member is welded to an inner peripheral surface of the opening so that the coupling member is fixed to the bag body.

9. The toner container according to claim 1, wherein the nozzle includes a connecting member, and the connecting member includes a discharge channel configured to discharge the toner stored in the bag body, and the connecting member is connected to the coupling member.

10. The toner container according to claim 1, wherein the two-dimensional code is formed by being printed on the outer surface of the side portion.

11. The toner container according to claim 1, wherein the two-dimensional code is code that is to be displayed with information in both horizontal and vertical directions, and wherein the two-dimensional code is capable of providing information regarding at least the toner container by being scanned.

12. A toner container comprising:

a flexible bag body configured to store toner, the bag body including a side portion formed into a bottomed cylindrical shape which includes an opening, the side portion extending in a first direction from the opening to a bottom portion opposite the opening;

a coupling member coupled with the opening; and a nozzle connected to the coupling member and configured to discharge the toner stored in the bag body, wherein the bottom portion and the side portion are formed by welding a plurality of sheet members, and wherein a two-dimensional code is provided on the side portion, the side portion including a welded portion where edges of the sheet members are welded to each other.

13. An image forming system comprising:

an image bearing member configured to bear a toner image;

a developing device including a development container capable of storing toner and a developer bearing member which forms a toner image on the image bearing member through development using toner;

a mounting unit; and a toner container including:

a flexible bag body configured to store toner, the bag body including a side portion formed into a bottomed cylindrical shape which includes an opening, the side portion extending in a first direction from the opening to a bottom portion opposite the opening;

a coupling member coupled with the opening, and a nozzle connected to the coupling member and configured to discharge the toner stored in the bag body to the outside of the toner container, wherein the development container is capable of being refilled with the toner in the toner container mounted that enables the nozzle of the toner container to be mounted thereon, wherein a two-dimensional code is provided on an outer surface opposite an inner surface of the side portion that forms the bottomed cylindrical shape storing toner, the two-dimensional code being located closer to the bottom portion than to the opening in the first direction, and wherein, as compared with shapes of the bag body before and after toner is discharged through the nozzle from the bottomed cylindrical shape, an amount of change in a first thickness of the bag body corresponding to a position of the two-dimensional code is greater than an amount of change in a second thickness of the bag body at a position of the coupling member in a thickness direction of the bag body perpendicular to the first direction.

* * * * *